United States Patent
Katoh

(10) Patent No.: US 9,506,683 B2
(45) Date of Patent: Nov. 29, 2016

(54) HEAT EXCHANGER AND HEAT PUMP CYCLE PROVIDED WITH THE SAME

(71) Applicant: DENSO CORPORATION, Kariya, Aichi-pref. (JP)

(72) Inventor: Yoshiki Katoh, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 232 days.

(21) Appl. No.: 14/362,359

(22) PCT Filed: Dec. 3, 2012

(86) PCT No.: PCT/JP2012/007737
§ 371 (c)(1),
(2) Date: Jun. 2, 2014

(87) PCT Pub. No.: WO2013/084464
PCT Pub. Date: Jun. 13, 2013

(65) Prior Publication Data
US 2014/0345312 A1    Nov. 27, 2014

(30) Foreign Application Priority Data

Dec. 5, 2011  (JP) .................................. 2011-266139
Nov. 14, 2012 (JP) .................................. 2012-250454

(51) Int. Cl.
*F25D 21/06* (2006.01)
*B60H 1/00* (2006.01)
(Continued)

(52) U.S. Cl.
CPC .......... *F25D 21/06* (2013.01); *B60H 1/00342* (2013.01); *B60H 1/00921* (2013.01);
(Continued)

(58) Field of Classification Search
CPC ........ F25D 21/06; F25B 39/00; F25B 47/00; F28F 1/12; F28F 19/006; F28F 9/26; F28F 1/128; F28D 1/04; F28D 1/0233; F28D 1/05391; F28D 1/0408; F28D 2021/008; B60H 1/00921; B60H 1/00342; B60H 2001/00928

See application file for complete search history.

(56) References Cited

U.S. PATENT DOCUMENTS

2001/0035284 A1* 11/2001 Iwasaki ................. F28D 1/0435
                                                         165/135
2002/0017381 A1*  2/2002 Ozaki ................... F28D 1/0435
                                                         165/135

(Continued)

FOREIGN PATENT DOCUMENTS

JP          S6115092 A      1/1986
JP          H0330068 U      3/1991

(Continued)

OTHER PUBLICATIONS

Office Action dated Jul. 17, 2015 in the corresponding Chinese Application No. 201280059950.0 with English translation.

(Continued)

*Primary Examiner* — Emmanuel Duke
(74) *Attorney, Agent, or Firm* — Harness, Dickey & Pierce, P.L.C.

(57) ABSTRACT

A heat exchanger includes a refrigerant tube through which a refrigerant for absorbing heat from air flows, and a defrosting medium tube through which a coolant for supplying heat for defrosting flows. Two fins disposed on both sides of the refrigerant tube include a protrusion protruding toward an upstream side of the flow of air with respect to the refrigerant tube. The protrusion is provided with a clearance that allows melt water generated in the defrosting to flow on the upstream side of the refrigerant tube. The refrigerant tubes and the defrosting medium tubes can be alternately arranged in the upstream line. The protrusion protrudes such that the air can be introduced into an air passage from the side portion of the protrusion even when an end facing the upstream side of the flow of the air is closed with the core of frost.

20 Claims, 26 Drawing Sheets

[HEAT 1]

(51) Int. Cl.

| | | |
|---|---|---|
| *F28F 9/26* | (2006.01) | |
| *F28F 19/00* | (2006.01) | |
| *F28D 1/04* | (2006.01) | |
| *F28D 1/053* | (2006.01) | |
| *F28F 1/12* | (2006.01) | |
| *F28D 1/02* | (2006.01) | |
| *F25B 39/00* | (2006.01) | |
| *F25B 47/00* | (2006.01) | |
| *F28D 21/00* | (2006.01) | |

(52) U.S. Cl.
CPC ............... *F25B39/00* (2013.01); *F25B 47/00* (2013.01); *F28D 1/0233* (2013.01); *F28D 1/04* (2013.01); *F28D 1/0408* (2013.01); *F28D 1/05391* (2013.01); *F28F 1/12* (2013.01); *F28F 1/128* (2013.01); *F28F 9/26* (2013.01); *F28F 19/006* (2013.01); *B60H 2001/00928* (2013.01); *F28D 2021/008* (2013.01)

(56) References Cited

U.S. PATENT DOCUMENTS

| | | | |
|---|---|---|---|
| 2002/0189799 A1* | 12/2002 | Ozaki | F28D 1/05366 165/152 |
| 2004/0060316 A1* | 4/2004 | Ito | B60H 1/00328 62/324.1 |
| 2007/0199686 A1 | 8/2007 | Okinotani et al. | |
| 2009/0113911 A1* | 5/2009 | Nakayama | F24D 17/02 62/238.6 |
| 2011/0016896 A1* | 1/2011 | Oomura | B60H 1/00785 62/155 |
| 2013/0081419 A1 | 4/2013 | Katoh et al. | |

FOREIGN PATENT DOCUMENTS

| | | |
|---|---|---|
| JP | H0433860 U | 3/1992 |
| JP | 6-147785 | 5/1994 |
| JP | 7-35013 | 2/1995 |
| JP | H11157326 A | 6/1999 |
| JP | 2007155268 A | 6/2007 |
| JP | 2007232246 A | 9/2007 |
| JP | 2008051396 A | 3/2008 |
| JP | 2008221997 A | 9/2008 |
| JP | 2009-299963 | 12/2009 |
| JP | 2012017092 A | 1/2012 |

OTHER PUBLICATIONS

International Search Report and Written Opinion (in Japanese with English Translation) for PCT/JP2012/007737, mailed Feb. 5, 2013; ISA/JP.

Office Action dated Aug. 18, 2015 in the corresponding Japanese Application No. 2012-250454 with translation.

* cited by examiner

[DEFROST]

[DEFROST]

(T3 > T2 > T1)

HEAT EXCHANGER AND HEAT PUMP CYCLE PROVIDED WITH THE SAME

CROSS REFERENCE TO RELATED APPLICATIONS

This application is a U.S. National Phase Application under 35 U.S.C. 371 of International Application No. PCT/JP2012/007737 filed on Dec. 3, 2012 and published in Japanese as WO/2013/084464 A1 on Jun. 13, 2013. This application is based on Japanese Patent Applications No. 2011-266139 filed on Dec. 5, 2011, and No. 2012-250454 filed on Nov. 14, 2012. The disclosures of all of the above applications are incorporated herein by reference.

FIELD OF THE INVENTION

The present disclosure relates to a heat exchanger suitable for defrosting, and a heat pump cycle including the heat exchanger.

BACKGROUND ART

Patent Document 1 discloses a heat pump cycle and a defrosting control of an evaporator in the heat pump cycle.

RELATED ART DOCUMENT

Patent Document

[Patent Document 1] JP-A-2008-221997

SUMMARY OF INVENTION

The inventors of the present application have found through studies that the technique disclosed in Patent Document 1 does not pay sufficient attention to discharging performance of melt water generated by defrosting. Thus, the melt water might be difficult to be discharged quickly. The melt water often interrupts the progress of defrosting. For example, the melt water takes the heat for defrosting. In another aspect, when the melt water remains on the surface of a heat exchanger, the water might be frozen again.

In the technique disclosed in Patent Document 1, the core of frost might straightly grow from one tube to another, thereby closing an air passage of the heat exchanger at an early stage.

From the other perspective, the technique disclosed in Patent Document 1 might not make effective use of the heat from a heat source. Thus, it sometimes becomes difficult to perform defrosting quickly.

It is an object of the present disclosure to provide a heat exchanger with an improved resistance to frost formation, and a heat pump cycle including the same.

It is an object of the present disclosure to provide a heat exchanger with an improved defrosting performance, and a heat pump cycle including the same.

It is another object of the present disclosure to provide a heat exchanger with an improved defrosting performance and an improved resistance to frost formation, and a heat pump cycle including the same.

It is a further object of the present disclosure to provide a heat exchanger suitable for use in a heat pump cycle proposed by the inventors in Japanese Patent Application No. 2011-123199, and a heat pump cycle using the same.

According to a first aspect of the present disclosure, a heat exchanger includes a tube portion including a plurality of refrigerant tubes in which a refrigerant for exchanging heat with air flows, and a plurality of medium tubes in which a medium for exchanging heat with the refrigerant flows, a plurality of air passages provided between adjacent tubes of the tube portion, and a plurality of fins provided in the air passages and bonded to the adjacent tubes of the tube portion. In the heat exchanger, a first group of the refrigerant tubes and a first group of the medium tubes are disposed on an inflow side for the air of the tube portion, and each of the fins includes a protrusion extending at least in the vicinity of the adjacent medium tube, and protruding toward an upstream side of flow of the air with respect to the medium tube.

With this structure, the refrigerant tube allows the refrigerant absorbing heat from air to flow therethrough. The refrigerant tube is at a low temperature, so that frost is formed at the refrigerant tube and fin. The frost grows largely in the vicinity of the refrigerant tube. The fin includes a protrusion protruding toward an upstream side of the flow of the air on the medium tube side. The medium tube allows the medium for supplying heat to the refrigerant to flow therethrough. The side portion of the protrusion is positioned in the vicinity of the medium tube, and thus is less likely to be covered by the frost. In the present disclosure, even though the frost is generated, the air can be introduced from the side portion of the protrusion. With this structure, the closing of the air passage with the frost formation can be suppressed, thereby providing the heat exchanger with excellent resistance to frost formation.

In a second aspect of the present disclosure, the protrusion may have an end facing an upstream side of the flow of the air. Even when a space in the vicinity of the end is closed by a core of frost, the protrusion may protrude such that the air can be introduced into the air passage from a side portion of the protrusion. In this case, even when the frost grows to such a degree that the end on the upstream side of the fin is closed, the air can be introduced from the side portion.

In a third aspect of the present disclosure, the tube portion may include one upstream line in which the tubes are arranged in one line, and one downstream line in which the tubes are arranged in one line and which is positioned on a downstream side of the flow of the air with respect to the upstream line. The upstream line may include a second group of the medium tubes, and the downstream line may include a second group of the refrigerant tubes. The second group of the medium tubes in the upstream line may be positioned on the upstream side of flow of the air with respect to the second group of the refrigerant tubes in the downstream line. In this case, even when a part of heat of the medium is supplied to the air in the upstream line, the heat can be supplied from the air to the refrigerant tube in the downstream line. Thus, the heat of the medium can be effectively supplied to the refrigerant.

In a fourth aspect of the present disclosure, the refrigerant flowing through the medium tubes may be a defrosting medium for supplying heat for defrosting. One of the first group of refrigerant tubes may be positioned between two of the first group of medium tubes on an inflow side for the air of the tube portion, and the refrigerant tubes and the medium tubes may be arranged in parallel. The protrusion may protrude toward the upstream side of the flow of the air with respect to the refrigerant tubes. The two protrusions with one of the refrigerant tubes disposed therebetween may form a clearance therebetween that allows melt water generated in the defrosting to flow clearance on an upstream side of the refrigerant tube.

In this case, the refrigerant tube allows the refrigerant absorbing heat from air to flow therein. The refrigerant tube is at a low temperature, so that frost is formed at the refrigerant tube and fin. The frost grows largely in the vicinity of the refrigerant tube. The two fins disposed on both sides of the refrigerant tube each may have a protrusion. The protrusion may form a clearance that allows melt water generated in the defrosting to flow the clearance on an upstream side of the air flow with respect to the refrigerant tube. The medium tube allows the medium for defrosting to flow therethrough. At this time, the frost generated on the heat exchanger is melt into melt water. The melt water is generated in a large amount near the refrigerant tubes. The clearance is formed on the upstream side of the refrigerant tube, and thereby it can effectively flow the melt water therefrom. Thus, the defrosting performance can be improved.

In a fifth aspect of the present disclosure, the tube portion may include one upstream line in which the tubes are arranged in one line, and one downstream line in which the tubes are arranged in one line and which is positioned on a downstream side of the flow of the air with respect to the upstream line. The upstream line may include a second group of the medium tubes, and a second group of the refrigerant tubes. The second group of the refrigerant tubes and the second group of the medium tubes may be alternately arranged in at least the upstream line such that one of the second group of the refrigerant tubes is positioned between two of the second group of the medium tubes. In this case, the refrigerant tubes can be distributed in a wide range. That is, the refrigerant tubes can be provided over a wide range of the tube portion. As a result, the frost can be distributed in the wide range of the tube portion. Further, the medium tube may be positioned adjacent to the refrigerant tube. Thus, the heat for defrosting can be effectively transferred to the core of frost grown near the refrigerant tube. The clearance may be formed between the protrusions on the upstream side of the refrigerant tubes positioned in the upstream line. As a result, the melt water caused by the core of the frost which is likely to grow in the upstream line can be effectively flown.

In a sixth aspect of the present disclosure, the refrigerant tubes and the medium tubes may be arranged to extend in the direction of gravitational force, and the clearance may extend along the refrigerant tube. In this case, the clearance extends along the refrigerant tube, that is, vertically in the direction of gravitational force. Thus, the melt water is apt to flow by the gravitational force.

In a seventh aspect of the present disclosure, the fins may be formed of a corrugated fin, and each of the fins may have a plurality of peak portions bonded to the refrigerant tube. A pair of the peak portions of two of the fins with one of the refrigerant tubes disposed therebetween may be arranged such that one of the pair of the peak portions and the other of the pair of the peak portions are alternately arranged in the direction of gravitational force. In this case, the peak portions are alternately arranged on both sides of the refrigerant tube vertically along the direction of gravitational force. The melt water flowing from the upper side to the lower side falls while being transversely alternately in contact with the peak portions positioned on both sides. Thus, the melt water can be suppressed from being stored in the form of water drop.

In an eighth aspect of the present disclosure, the fins may be formed of a corrugated fin, and each of the fins may have a plurality of peak portions bonded to the refrigerant tube. The width of the refrigerant tube may be smaller than a half of the width of the pitch of the fin. In this case the width of the clearance formed between the protrusions corresponds to the width of the refrigerant tube, which can decrease the width of the clearance to less than a half of the fin pitch. As a result, the melt water easily flows into the clearance. Thus, the melt water can be suppressed from being stored in between the pleats of the corrugated fin.

In a ninth aspect of the present disclosure, the width of the refrigerant tube may be smaller than that of the medium tube. In this case, the clearance between the fins on the upstream side of the refrigerant tube is formed narrowly, whereby the clearance between the fins on the upstream side of the medium tube can be formed widely.

In a tenth aspect of the present disclosure, a heat pump cycle may include a heat exchanger; a refrigerant circuit for flowing a refrigerant to the refrigerant tube, thereby supplying heat absorbed in a refrigerant to a user-side heat exchanger; a medium circuit for flowing the medium to the medium tube; and a controller for controlling a temperature of the medium in the heat exchanger to a higher temperature than a temperature of the refrigerant when the refrigerant absorbs heat in the refrigerant tube. In this case, the closing of the air passage by the frost formation can be suppressed, producing the heat pump cycle with excellent resistance to frost formation. The temperature of the medium in the heat exchanger is controlled to be higher than that of the refrigerant in the heat exchanger, which can suppress the frost formation on the side portion of the protrusion.

In an eleventh aspect of the present disclosure, the controller may control the temperature of the medium to between a temperature of the air and the temperature of the refrigerant. In this case, the heat of air can be supplied to the refrigerant. The heat of medium can also be supplied to the refrigerant. Further, a part of the heat of the air can be supplied to the refrigerant via the medium.

In a twelfth aspect of the present disclosure, the controller may control the temperature of the medium to a temperature higher than the temperature of the air and the temperature of the refrigerant. In this case, the heat of the air can be supplied to the refrigerant. The heat of medium can be supplied to the refrigerant. Further, a part of heat of the air can be supplied to the refrigerant via the air.

The heat pump cycle is appropriate for a heat exchanger including the medium tubes in the upstream line and the refrigerant tubes in the downstream line which are superimposed in the flow direction of the air. In this case, even though a part of heat of the medium in the upstream line is supplied to the air, the heat can be supplied from the air to the refrigerant tube in the downstream line. Thus, the heat of the medium can be effectively supplied to the refrigerant.

In a thirteenth aspect of the present disclosure, a heat pump cycle may include a heat exchanger; a refrigerant circuit for flowing a refrigerant to the refrigerant tube, thereby supplying heat absorbed in the refrigerant to a user-side heat exchanger; and a medium circuit for flowing the medium to the medium tube. The medium flowing through the medium tube may be a heat storage medium for storing therein heat from an external heat source. The medium circuit may maintain the temperature of the external heat source at a temperature higher than the temperature at which the refrigerant in the refrigerant tube absorbs heat. In this case, the heat pump cycle including the heat exchanger with excellent defrosting performance can be provided. The temperature of the medium flowing through the medium tube can be higher than the temperature at which the refrigerant absorbs heat in the refrigerant tube. Further, the heat for defrosting can be stored in the heat storing medium. As a result, a large amount of heat can be supplied to the frost from the medium tube. Even though a large amount of melt water is generated due to a great amount of heat for defrosting much, the clearance serves as the passage for the defrosting, so that the melt water can be discharged quickly. Thus, the defrosting performance can be improved by a great amount of heat for defrosting, and further improved by quick discharging of the melt water.

In a fourteenth aspect of the present disclosure, the medium circuit may supply heat to be absorbed in the refrigerant flowing through the refrigerant tube. In this case, the medium flowing through the defrosting medium tube can promote absorption of heat in the refrigerant of the refrigerant tube. As a result, a great amount of heat can be absorbed in the refrigerant of the refrigerant tube.

In a fifteenth aspect of the present disclosure, the refrigerant circuit may supply heat for defrosting by use of refrigerant flowing through the refrigerant tube in defrosting. In this case, the heat for defrosting can be supplied from the defrosting medium tube, and the heat for defrosting can also be supplied from the refrigerant tube. Thus, the defrosting performance can be improved.

DESCRIPTION OF EMBODIMENTS

Plural embodiments for implementing the present disclosure will be described with reference to the drawings. In the respective embodiments, parts corresponding to items described in preceding embodiments are denoted by the same reference symbols, and a repetitive description thereof may be omitted. In the respective embodiments, when only a part of the configuration is described, another embodiment described precedingly can be applied to the other portions of the configuration. Also, in the subsequent embodiments, parts corresponding to the items described in the preceding embodiment are denoted by reference symbols different in only hundreds or higher digit to express a correspondence relationship, and a repetitive description thereof may be omitted. In the respective embodiments, in addition to the combinations of the respective parts which can be explicitly specifically combined together, the respective embodiments can be partially combined together even if not explicitly described, if no problem particularly occurs in the combination.

First Embodiment

Figure 1:
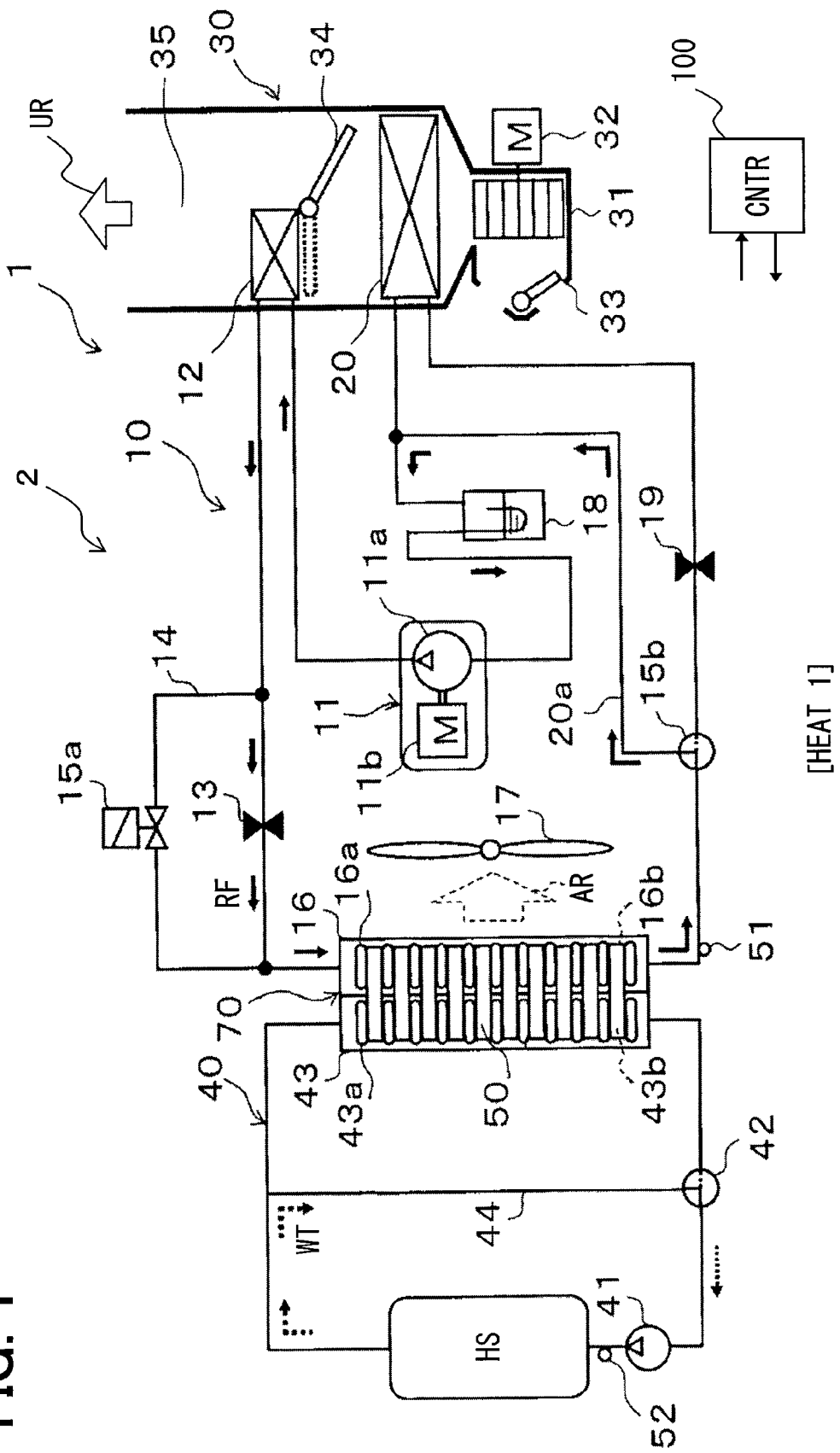
FIG. 1 is a schematic diagram showing a heating operation of a heat pump cycle according to a first embodiment of the present disclosure.

Referring to FIG. 1, in an embodiment of the present disclosure, an air conditioner 1 for a vehicle is provided. The air conditioner 1 includes a heat pump cycle 2 to which the present disclosure is applied. The heat pump cycle 2 includes a heat exchanger 70 to which the present disclosure is applied. The heat pump cycle 2 includes a refrigerant circuit 10 and a coolant circuit 40.

The air conditioner 1 is usable for the so-called hybrid car which obtains power for traveling from both an internal combustion engine (engine) and an electric motor-generator. The heat pump cycle 2 uses at least one of the engine, the electric motor-generator, an inverter circuit, a battery, and a control circuit for the hybrid car as an external heat source HS. The external heat source HS can use one of vehicle-mounted devices that generate heat in operation. The coolant circuit 40 also serves as a cooling system that cools the external heat source HS to keep the heat source at an appropriate temperature. The air conditioner 1 can be used to any one of a vehicle using an engine as the power source, the hybrid car, and a vehicle using only an electric motor as the power source. In recent years, most of the vehicles have less waste heat supplied from the power source. Thus, it is difficult to suppress the frost formation on an exterior heat exchanger 16, and/or to achieve a defrosting operation only by use of the waste heat from the power source. This embodiment provides the heat pump cycle 2 that can effectively use the waste heat from the power source to suppress the frost formation on the exterior heat exchanger 16, and/or to achieve the defrosting operation.

The air conditioner 1 includes an air conditioning unit 30 for blowing the air UR toward a vehicle interior as a space to be air-conditioned. The air conditioner 1 includes a controller (CNTR) 100 for controlling the heat pump cycle 2 and the air conditioning unit 30.

The air conditioning unit 30 is disposed in the vehicle interior. The air conditioning unit 30 includes a casing 31 for providing a duct for air UR to be fed to the vehicle interior. The air conditioning unit 30 includes parts, such as a blower 32, an interior condenser 12, and an interior evaporator 20, in the casing 31. An inside/outside air switching portion 33 is disposed on the most upstream side of the casing 31 to selectively or mixedly introduce air inside the vehicle interior and air outside the vehicle interior. The blower 32 for blowing the air UR is disposed on the downstream side of the inside/outside air switching portion 33. The interior evaporator 20 and the interior condenser 12 are disposed in that order with respect to the flow of the air UR on the downstream side of the blower 32. The interior evaporator 20 is disposed on the upstream side with respect to the interior condenser 12. The interior evaporator 20 is a heat exchanger for cooling the air UR by exchanging heat between the air UR and the refrigerant flowing therethrough. The interior condenser 12 is a heat exchanger for heating that exchanges heat between the high-temperature and high-pressure refrigerant flowing therethrough and the air UR having passed through the interior evaporator 20. An air mix door 34 is disposed on the downstream side of the interior evaporator 20 and on the upstream side of the interior condenser 12. The air mix door 34 adjusts a ratio of air passing through the interior condenser 12 to the air UR having passed through the interior evaporator 20. A mixing space 35 is disposed on the downstream side of the interior condenser 12. The mixing space 35 serves to mix the air UR heated by the interior condenser 12 and the air UR bypassing the interior condenser 12 without being heated. The downstream side of the mixing space 35 is in communication with the vehicle interior via air outlets.

The refrigerant circuit 10 is provided by a reversible vapor compression refrigeration cycle. The refrigerant circuit 10 is a refrigerant cycle for heating of the air conditioner 1. The refrigerant circuit 10 additionally can also serve as a refrigeration cycle for cooling. The refrigerant circuit 10 provides the heat pump cycle as narrowly-defined, which uses the air AR outside the vehicle compartment as a heat source. The refrigerant circuit 10 is called a refrigerant system. The refrigerant circuit 10 allows the refrigerant RF to flow to refrigerant tubes 16a to be described later, thereby supplying the heat absorbed in the refrigerant RF to the interior condenser 12.

The refrigerant circuit 10 heats or cools the air UR to be blown into the vehicle interior. The refrigerant circuit 10 can switch between flow paths to perform a heating operation for heating the vehicle interior by heating the air UR or a cooling operation for cooling the vehicle interior by cooling the air UR. The refrigerant circuit 10 can perform a defrosting operation which involves melting and removing frost attached to the exterior heat exchanger 16 serving as an evaporator for evaporating the refrigerant during the heating operation. Further, the refrigerant circuit 10 can perform a waste heat recovering operation which involves absorbing heat from the external heat source HS in the refrigerant during the heating operation. The controller 100 performs switching among the operating modes.

The compressor 11 is disposed in an engine room. The compressor 11 compresses and discharges the refrigerant sucked in the refrigerant circuit 10. The compressor 11 includes a scroll-type or a vane-type compression mechanism 11a, and an electric motor 11b for driving the compression mechanism 11a. The electric motor 11b is controlled by the controller 100. The interior condenser 12 is provided as a user-side heat exchanger on the discharge side of the compressor 11.

A fixed throttle 13 for heating is provided on the downstream side of the interior condenser 12. The fixed throttle 13 decompresses and expands the refrigerant flowing from the interior condenser 12 during the heating operation. The fixed throttle 13 serves as the decompression means for the heating operation. The fixed throttle 13 can be provided in the form of orifice, capillary tube, or the like. The exterior heat exchanger 16 is provided on the downstream side of the fixed throttle 13. Further, a passage 14 for bypassing the fixed throttle 13 is provided on the downstream side of the interior condenser 12. The passage 14 allows the refrigerant flowing from the interior condenser 12 to be guided to the exterior heat exchanger 16, while bypassing the fixed throttle 13. An opening/closing valve 15a for opening and closing the passage 14 is disposed in the passage 14. The opening/closing valve 15a is an electromagnetic valve. The loss in pressure at the opening/closing valve 15a is much smaller than that at the fixed throttle 13. Thus, when the opening/closing valve 15a is opened, the refrigerant itself flows through the passage 14. In contrast, when the opening/closing valve 15a is closed, the refrigerant itself flows through the fixed throttle 13. Thus, the opening/closing valve 15a switches between the flow paths in the refrigerant circuit 10. The opening/closing valve 15a serves as switching means for a refrigerant flow path. The switching means may be formed of an electric three-way valve.

The exterior heat exchanger 16 exchanges heat between the refrigerant flowing therethrough and the air AR. The exterior heat exchanger 16 is disposed in the engine room. The exterior heat exchanger 16 serves as an evaporator for evaporating the low-pressure refrigerant to exhibit a heat absorption effect during the heating operation. The exterior heat exchanger 16 serves as a radiator for dissipating heat from the high-pressure refrigerant in the cooling operation. The exterior heat exchanger 16 is integral with a radiator 43. The radiator 43 exchanges heat between the air AR and the coolant in the coolant circuit 40.

The blower fan 17 is an electric blower for blowing the air AR into the exterior heat exchanger 16. The blower fan 17 provides an outside air blowing means for blowing the air AR to both the exterior heat exchanger 16 and the radiator 43. The exterior heat exchanger 16 and the radiator 43 are called as a heat exchanger 70 or a composite heat exchanger 70.

An electric three-way valve 15b is connected to the downstream side of the refrigerant flow direction of the exterior heat exchanger 16. The three-way valve 15b is controlled by the controller 100. The three-way valve 15b serves as switching means for the refrigerant flow path together with the opening/closing valve 15a. The three-way valve 15b directly connects an outlet of the exterior heat exchanger 16 to an inlet of an accumulator 18 without a heat exchanger in the heating operation. The three-way valve 15b serves to connect the outlet of the exterior heat exchanger 16 to an inlet of a fixed throttle 19 in the cooling operation. The fixed throttle 19 is decompression means for cooling. The fixed throttle 19 decompresses and expands the refrigerant flowing from the exterior heat exchanger 16 in the cooling operation. The fixed throttle 19 has the same structure as that of the fixed throttle 13.

The interior evaporator 20 is provided on the downstream side of the fixed throttle 19. The accumulator 18 is provided on the downstream side of the interior evaporator 20. A flow path formed by the three-way valve 15b in the heating operation, and making the three-way valve 15b directly in communication with the accumulator 18 forms a passage 20a for allowing the flow of the refrigerant on the downstream side of the exterior heat exchanger 16 while bypassing the interior evaporator 20. The accumulator 18 is a gas-liquid separator for the low-pressure refrigerant that separates the refrigerant flowing thereto into gas and liquid phases to store an excessive refrigerant in the cycle. The compressor 11 is provided at the outlet for the gas phase of the accumulator 18. The accumulator 18 serves to prevent the liquid compression of the compressor 11 by suppressing the suction of the liquid-phase refrigerant into the compressor 11.

The coolant circuit 40 is a heat source device for supplying heat to the refrigerant circuit 10 from the external heat source HS. The coolant circuit 40 allows a coolant used as a heat transfer medium and a heat storage medium to flow therethrough. The coolant circuit 40 also serves as a heat source device for defrosting that supplies heat for defrosting the heat exchanger 70. The coolant circuit 40 including the external heat source HS is called a water system or an external heat source system. The coolant circuit 40 is also called the defrosting medium circuit 40 that allows a defrosting medium to flow therethrough, thereby supplying heat for defrosting. The coolant circuit 40 permits the medium for defrosting to flow to a water tube 43a to be described later. The medium flowing through the water tube 43a is a heat storage medium for storing therein heat from the external heat source HS for supplying the heat for the defrosting. The coolant circuit 40 keeps the temperature of the external heat source HS higher than that of the refrigerant absorbing heat in the refrigerant tubes 16a. The coolant circuit 40 is also a heat source device that supplies heat for suppressing the frost formation on the heat exchanger 70. The coolant circuit 40 is also called a medium circuit 40 for circulating the medium to suppress the frost formation.

The coolant circuit 40 is a cooling medium circulation circuit for allowing the coolant to circulate through the external heat source HS, thereby cooling the external heat source HS. The coolant circuit 40 includes parts, such as a pump 41, an electric three-way valve 42, a radiator 43, and a bypass passage 44 for allowing the coolant to flow bypassing the radiator 43. The pump 41 is an electric pump for pressure-feeding the coolant to the coolant circuit 40. The three-way valve 42 performs switching between flow paths in the coolant circuit 40. The three-way valve 42 switches between one flow path leading from the external heat source HS to the radiator 43, and another flow path leading from the external heat source HS to the bypass passage 44. When the coolant flows to the bypass passage 44 by the three-way valve 42 to bypass the radiator 43, the coolant has its temperature increased without dissipating heat at the radiator 43. In other words, at this time, the heat is stored in the coolant. The radiator 43 is disposed in the engine room. The radiator 43 is a heat exchanger for heat dissipation that exchanges heat between the coolant and the air AR blown from the blower fan 17. The radiator 43 is integrally structured with the exterior heat exchanger 16 to form the heat exchanger 70. When the coolant flows to the radiator 43 by the three-way valve 42, the coolant dissipates heat at the radiator 43. The coolant transfers heat to the air UR and/or refrigerant.

The heat exchanger 70 exchanges heat between two elements, from among the air AR, the refrigerant RF, and the coolant WT. That is, the heat exchanger 70 exchanges heat between the refrigerant RF and the coolant WT, between the refrigerant RF and the air AR, and between the coolant WT and the air AR. The heat exchanger 70 includes a plurality of tubes for flowing the refrigerant or coolant, and other parts, including a collection tank and a distribution tank disposed on both ends of the tubes.

The exterior heat exchanger 16 has a plurality of refrigerant tubes 16a for allowing the refrigerant to flow therethrough. The refrigerant tube 16a is a tube for heat exchange through which the refrigerant RF exchanging heat with the air flows. The refrigerant tube 16a is a flat tube having a flat cross-sectional shape in its cross-sectional view perpendicular to the longitudinal direction. The radiator 43 has a plurality of water tubes 43a for allowing the coolant to flow therein. The water tube 43a is a tube for heat exchange that flows the medium to supply heat for frosting, for example. The water tube 43a is also called a frost medium tube that flows the medium for defrosting. The water tube 43a is a flat tube having a flat cross-sectional shape in its cross-sectional view perpendicular to the longitudinal direction. In the following, the refrigerant tube 16a and the water tube 43a are hereinafter referred to as tubes 16a and 43a. The refrigerant tube 16a and the water tube 43a may be used by way of one part of the tube portion.

The tubes 16a and 43a are arranged such that wide flat surfaces of the outer surfaces thereof are substantially parallel to the flow of air AR. The tubes 16a and 43a are arranged with a predetermined spacing therebetween. Air passages 16b and 43b through which the air AR flows are formed around the tubes 16a and 43a. The air passages 16b and 43b are used as an air passage for heat dissipation and/or an air passage for heat absorption.

The tubes 16a and 43a are arranged to make lines in the direction perpendicular to the flow of the air AR. Further, the tubes 16a and 43a are disposed in a number of lines in the flow direction of the air AR. As shown in the figure, the tubes 16a and 43a can be arranged in two lines. The tubes 16a and 43a are arranged to form an upstream line positioned on the upstream side in the flow direction of the air AR, and a downstream line positioned on the downstream side rather than the upstream line.

In the upstream line, at least parts of the refrigerant tube 16a and water tube 43a are adjacent to each other. In the upstream line, at least parts of the water tubes 43a can be positioned on both sides of the refrigerant tubes 16a. In the upstream line, at least parts of the refrigerant tubes 16a can be positioned on both sides of the water tubes 43a. Further, in the upstream line, at least parts of the refrigerant tube 16a and the water tube 43a can be positioned alternately. The refrigerant tubes 16a and the water tubes 43a are alternately arranged such that the water tube 43a is positioned on both sides of the refrigerant tube 16a at least in the upstream line. That is, in the heat exchanger 70 on the inflow side of the air AR, the water tubes 43a are positioned on both sides of the refrigerant 16a, and arranged in parallel. This structure can diffuse the refrigerant tubes within a wide range. As a result, the frost formation can be diffused within a wide range. Further, the defrosting medium tube is positioned adjacent to the refrigerant tube. Thus, the heat for defrosting can be effectively transferred to a core of frost grown near the refrigerant tube.

Also, in the downstream line, the refrigerant tubes 16a and the water tubes 43a are arranged in the same way as in the upstream line. Instead of this, only the refrigerant tubes 16a, or only the water tubes 43a may be arranged in the downstream line.

The tubes 16a and 43a can be arranged such that a number of water tubes 43a are positioned in the upstream line and that a small number of water tubes 43a are positioned in the downstream line. Alternatively, the tubes 16a and 43a can be arranged such that the water tubes 43a are positioned only in the upstream line. Thus, the radiator 43 is positioned mainly on the upstream side of the flow of the air AR, and the exterior heat exchanger 16 is positioned mainly on the downstream side thereof.

Fins 50 are disposed in the air passages 16b and 43b. The fins 50 are outer fins for promoting the heat exchange between the air AR and the tubes 16a and 43a. Each fin 50 is bonded to two tubes 16a and 43a adjacent to each other in line. Further, the fin 50 is bonded to other two tubes 16a and 43a positioned in the flow direction of the air AR. Thus, one fin 50 is bonded to at least four tubes 16a and 43a. The fins 50 are integrally structured with the exterior heat exchanger 16 and the radiator 43. The fin 50 is formed of a metal thin plate with excellent heat conductivity. Each fin 50 is comprised of a corrugated fin formed by bending a thin plate in a wave-like shape. The fins 50 promote the heat exchange between the refrigerant RF and the air AR. The fins 50 also promote the heat exchange between the coolant WT and the air AR. Further, the fins 50 promote the heat exchange between the refrigerant RF and the coolant WT. At least a part of fins 50 is bonded to both the refrigerant tube 16a and the water tube 43a. Thus, the fins 50 enable heat transfer between the refrigerant tube 16a and the water tube 43a. The two fins 50 disposed on both sides of one refrigerant tube 16a each are formed of the corrugated fin having its peak portions bonded to both sides of the refrigerant tube 16a.

A tank of the exterior heat exchanger 16 and a tank of the radiator 43 can be at least partly formed of the same member. The refrigerant tubes 16a, the water tubes 43a, the tanks, and the fins 50 are made of an aluminum alloy. These parts are brazed.

The heat exchanger 70 includes a core portion in which the tubes 16a and 43a and the fins 50 are disposed, and tank portions disposed on both ends of the core portion. The tubes 16a and 43a arranged in the core portion form a plurality of lines including at least the upstream line and the downstream line in the flow direction of the air AR. The two tank portions respectively include an inner tank adjacent to the core portion, and an outer tank positioned away from the core portion. The inner tank and the outer tank are expanded at the ends of the core portion to cover substantially the entire ends of the core portion. Thus, at one end of the core portion, the inner tank and the outer tank are stacked, while at the other end of the core portion, the inner tank and the outer tank are also stacked.

Parts of the tubes 16a and 43a are connected in communication with the inside of the inner tank, and the remaining parts of the tubes 16a and 43a are connected in communication with the inside of the outer tank. The remaining parts extend to penetrate the wall of the inner tank. The tubes 16a and 43b are distributed inside the core portion. The tubes 16a or 43a can be arranged to be nonuniformly distributed within the core portion. The arrangement of the tubes 16a and 43a in the core portion are set to comply with the performance of the heat exchange required for the exterior heat exchanger 16 and the radiator 43. The heat exchanger 70 enables a relatively flexible arrangement of the tubes 16a and 43a. For example, the tubes 16a or tubes 43a are distributed into the upstream line and the downstream line along the flow direction of the air AR. In other words, the tubes 16a and the tubes 43a can be mixed in the upstream line or downstream line.

The controller 100 is provided by a microcomputer including a computer-readable recording medium. The recording medium non-temporarily saves therein a computer-readable program. The recording medium can be provided in the form of semiconductor memory or magnetic disc. The program is executed by the controller 100, so that the controller 100 can work as the device described in the specification, and also serves to execute a control method described in the specification. Means provided by the controller 100 can be called a functional block or module achieving a predetermined function.

The controller 100 controls the operations of the devices 11, 15a, 15b, 17, 41, and 42. The controller 100 is connected to a plurality of sensors. The sensors can include an inside air sensor serving as inside air temperature detection means for detecting an inside air temperature, an outside air sensor for detecting an outside air temperature, a solar radiation sensor for detecting an amount of solar radiation in the vehicle interior, an evaporator temperature sensor for detecting a temperature of blown air (evaporator temperature) from the interior evaporator 20, and a discharge refrigerant temperature sensor for detecting the temperature of refrigerant discharged from the compressor 11. Furthermore, the sensors can also include an outlet refrigerant temperature sensor 51 for detecting an outlet side refrigerant temperature Te of the exterior heat exchanger 16, and a coolant temperature sensor 52 serving as coolant temperature detection means for detecting a coolant temperature Tw of the coolant flowing into the external heat source HS.

The controller 100 provides control means for controlling an amount of refrigerant flowing in the refrigerant circuit 10, and the flow paths. The amount of refrigerant is controlled by adjusting a refrigerant discharge capacity of the compressor 11. The flow path for the refrigerant is controlled by controlling the devices 15a and 15b. Further, the controller also provides another control means for controlling the flow of coolant and the flow paths in the refrigerant circuit. The flow of the coolant is controlled by controlling the pump 41. The flow path for the coolant is controlled by controlling a three-way valve 422.

The controller 100 provides frost formation determination means for determining whether or not the frost is formed on the exterior heat exchanger 16, based on detection signals from the sensors, and/or the timer. When a vehicle speed during traveling is lower than a predetermined reference vehicle speed, for example, 20 km/h, while the outlet side refrigerant temperature Te of the exterior heat exchanger 16 is lower than a predetermined reference temperature, for example, 0° C., the frost formation determination means determines that the frost is formed on the exterior heat exchanger 16. The controller 100 also provides defrosting control means for performing defrosting control for removing the frost attached onto the exterior heat exchanger 16. The defrosting control means controls the heat pump cycle 2.

The controller 100 controls the coolant circuit 40 such that the temperature of the coolant becomes lower than a predetermined upper limit temperature, and higher than a predetermined lower limit temperature. The controller 100 performs control so as to set a temperature T2 of the coolant WT in the heat exchanger 70 is higher than a temperature T1 of the refrigerant RF when absorbing heat by the refrigerant RF in the refrigerant tubes 16 (T2>T1). The controller 100 controls the air conditioner 1 such that the air conditioner 1 selectively performs the cooling operation (COOL) or heating operation. Further, the control device 100 controls the air conditioner 1 so as to provide a normal heating operation (HEAT1), a defrosting operation (DEFROST), and a waste heat recovering operation (HEAT2) in the heating operation. When the frost formation determination means determines that the frost is formed during the normal heating operation, the operation proceeds to the defrosting operation. When the coolant temperature Tw detected by the coolant temperature sensor 52 is higher than a predetermined reference temperature, for example, 60° C. in the normal heating operation, the operation transfers to the waste heat recovering operation. When returning conditions are satisfied, the operation returns to the normal heating operation.

(a) Normal Heating Operation (HEAT1)

In a normal heating operation, the air UR is heated by the interior condenser 12 using the air AR outside the vehicle compartment as a heat source, whereby the heating of the vehicle interior is performed. The normal heating operation is started by operation of a switch by a user of the vehicle. The refrigerant circuit 10 is controlled such that the compressor 11 is operated with the opening/closing valve 15a closed while the three-way valve 15b connects the exterior heat exchanger 16 to the accumulator 18 via the flow path 20a. Thus, the refrigerant circuit 10 performs switching to a refrigerant flow path through which the refrigerant flows as indicated by the solid arrow in FIG. 1. The coolant circuit 40 is controlled such that the pump 41 press-feeds the coolant at a predetermined flow rate and that the three-way valve 42 flows the coolant to the bypass passage 44. The coolant circuit 40 performs switching to a circuit for allowing the coolant to flow therethrough as indicated by the dashed arrow of FIG. 1.

In the refrigerant circuit 10 in the normal heating operation, a high-pressure refrigerant discharged from the compressor 11 flows into the interior condenser 12. The refrigerant flowing into the interior condenser 12 exchanges heat with the air UR blown from the blower 32 and passing through the interior evaporator 20 to dissipate heat therefrom. Thus, the air UR is heated. The high-pressure refrigerant flowing from the interior condenser 12 flows into the fixed throttle 13 to be decompressed and expanded.

A low-pressure refrigerant decompressed and expanded by the fixed throttle 13 flows into the exterior heat exchanger 16. The low-pressure refrigerant flowing into the exterior heat exchanger 16 absorbs heat from the air AR blown by the blower fan 17 to evaporate itself. At this time, the coolant circuit 40 allows the coolant to flow to the bypass passage 44, which suppress the heat dissipation from the coolant to the refrigerant in the heat exchanger 70, and the heat absorption from the refrigerant to the coolant. In other words, the thermal correlation between the coolant and refrigerant is suppressed.

The refrigerant flowing from the exterior heat exchanger 16 flows into the accumulator 18 to thereby be separated into vapor and liquid phases. The vapor phase refrigerant separated by the accumulator 18 is sucked into and compressed by the compressor 11 again.

(b) Defrosting Operation (DEFROST)

Figure 2:
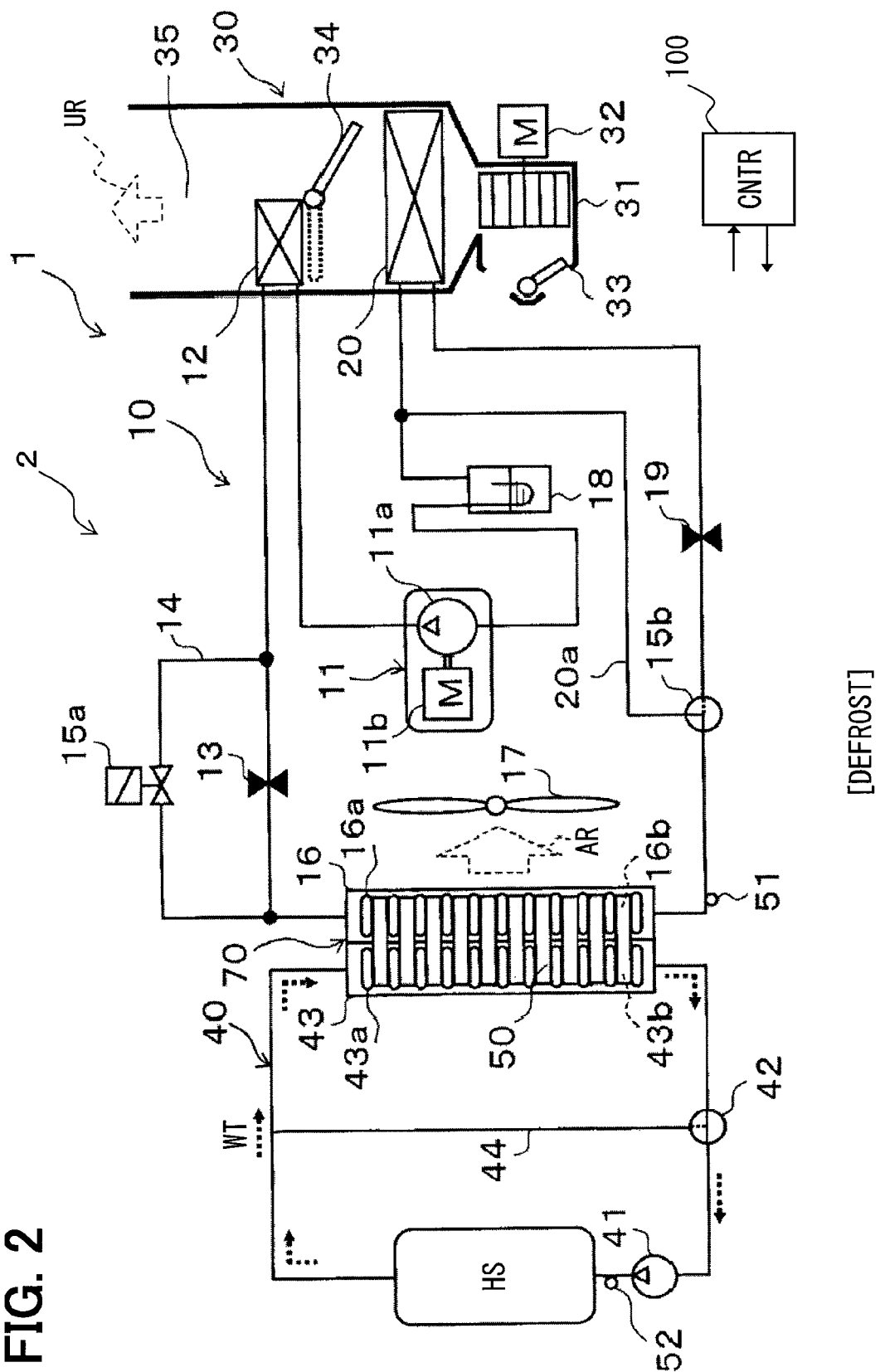
FIG. 2 is a schematic diagram showing a defrosting operation of the heat pump cycle in the first embodiment.

During a defrosting operation, the frost attached to the exterior heat exchanger 16 is melt by heat obtained from the coolant circuit 40. In the defrosting operation, the controller 100 stops the operation of the compressor 11 and also stops the operation of the blower fan 17. Thus, in the defrosting operation, the flow rate of refrigerant flowing into the exterior heat exchanger 16 is decreased as compared to in the normal heating operation, which decreases the volume of air AR flowing into the heat exchanger 70. Further, the controller 100 switches the three-way vale 42 so as to allow the coolant to pass through the radiator 43 as indicated by the dashed arrow of FIG. 2. Thus, the heat contained in the coolant passing through the water tube 43a of the radiator 43 is transferred to the exterior heat exchanger 16 via the fins 50, thereby defrosting the exterior heat exchanger 16. That is, the defrosting is performed by effectively using the waste heat from the external heat source HS.

The heat exchanger 70 includes the fins 50 formed of metal material, and can transfer heat between the refrigerant tubes 16a and the water tubes 43a. Thus, during the defrosting operation, the heat contained in the coolant can be transferred to the exterior heat exchanger 16 via the fins 50. As a result, the time for the defrosting operation can be shortened.

At the time of the defrosting operation, the operation of the compressor 11 is stopped, which reduces the flow rate of refrigerant flowing into the exterior heat exchanger 16 as compared to before transferring to the defrosting operation, for example, to 0 (zero). Thus, the heat can be prevented from being absorbed in the refrigerant flowing through the refrigerant tube 16a. In other words, in the defrosting operation, the operation of the compressor 11 is stopped to reduce the amount of heat absorbed in the refrigerant at the exterior heat exchanger 16, which can effectively use the heat of the coolant circuit 40 including the external heat source HS for the defrosting. Further, in the defrosting operation, the operation of the blower fan 17 is stopped, which reduces the volume of air AR flowing into the heat exchanger 70, for example, to 0 (zero). Thus, the absorption of heat in the air AR can be suppressed. Moreover, the refrigerant circuit 10 stores heat from the external heat source HS in the coolant circuit 40. Thus, the stored heat can complete the defrosting in a short time.

(c) Waste Heat Recovering Operation (HEAT2)

In a waste heat recovering operation, heating of the vehicle interior is performed using the external heat source HS as a heat source. The heat of the coolant circuit 40 can be dissipated into the air AR. When predetermined conditions are satisfied, the heat of the coolant circuit 40 are allowed to pass through the refrigerant circuit 10, thereby performing the waste heat recovering operation to enhance the heating capability. For example, when the coolant temperature Tw exceeds a predetermined reference temperature, for example, 60° C. in the heating operation, the waste heat recovering operation can be performed.

Figure 3:
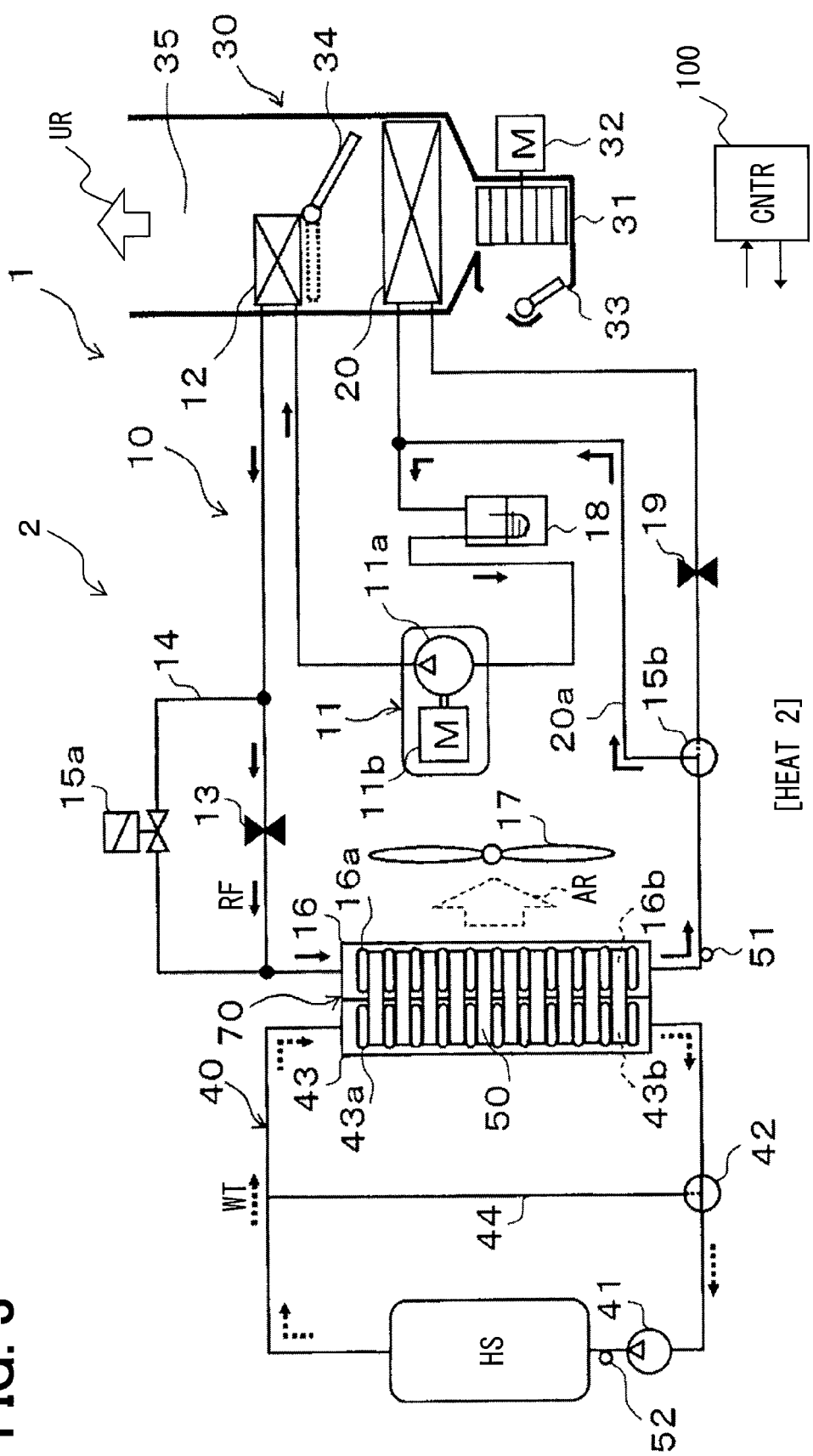
FIG. 3 is a schematic diagram showing a waste heat recovering operation of the heat pump cycle in the first embodiment.

In the waste heat recovering operation, the three-way valve 15b is controlled in the same manner as that in the normal heating operation. The three-way valve 42 is controlled in the same way as in the defrosting operation. Thus, as indicated by the solid arrow of FIG. 3, the high-pressure and high-temperature refrigerant discharged from the compressor 11 heats the air UR at the interior condenser 12, and decompressed and expanded by the fixed throttle 13 to flow into the exterior heat exchanger 16. The low-pressure refrigerant flowing into the exterior heat exchanger 16 absorbs both the heat contained in the air AR and the heat contained in the coolant and transferred via the fins 50 to evaporate itself. In this way, the coolant circuit 40 supplies the heat to be absorbed in the refrigerant RF flowing through the refrigerant tubes 16*a*. With this structure, the coolant WT flowing through the water tubes 43*a* promotes the heat absorption in the refrigerant RF in the refrigerant tubes 16*a*. As a result, the refrigerant RF within the refrigerant tubes 16*a* can absorb much heat. Consequently, the heating can be achieved by effectively using the exhaust heat from the external heat source HS.

(d) Cooling Operation (COOL)

Figure 4:
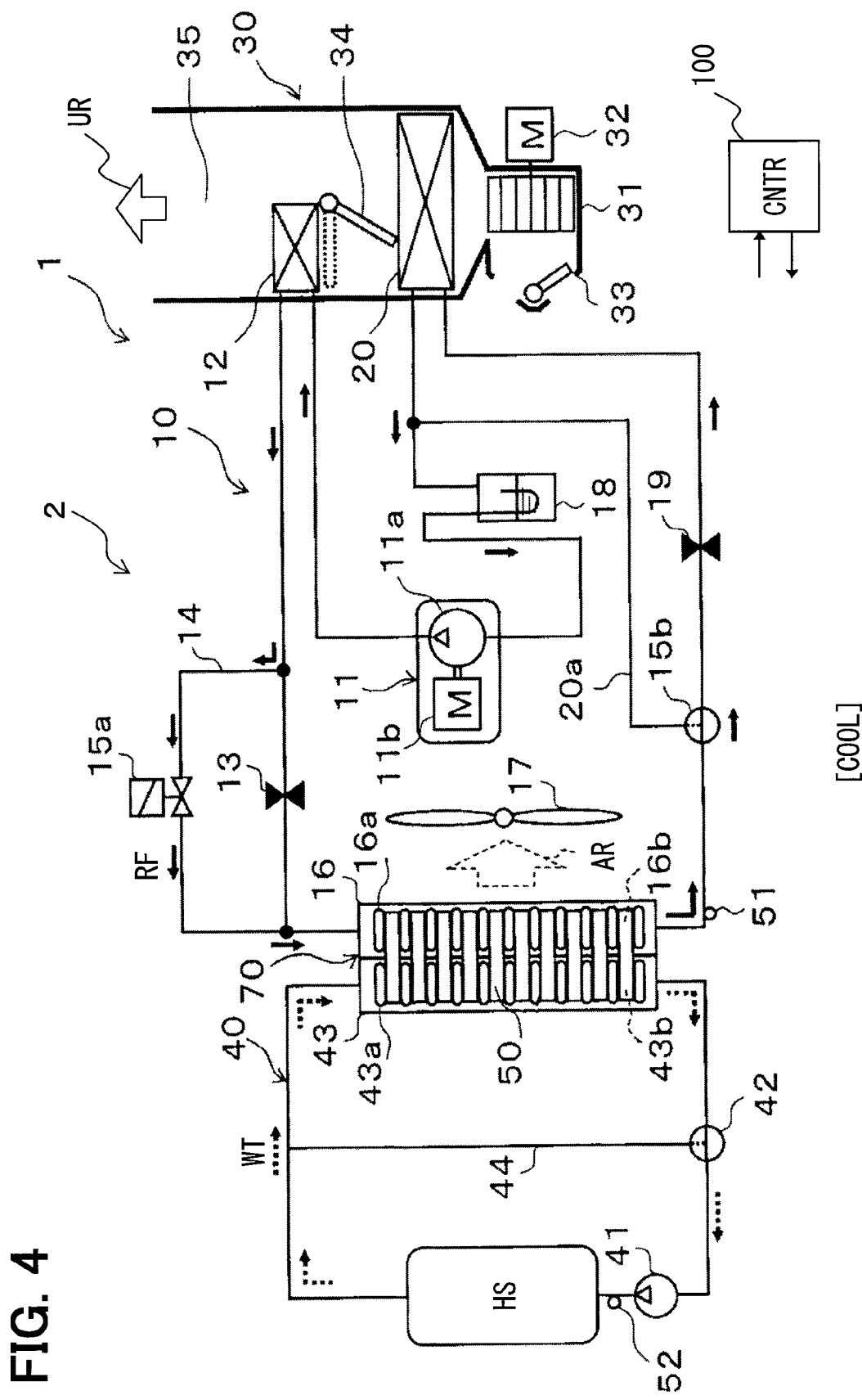
FIG. 4 is a schematic diagram showing a cooling operation of the heat pump cycle in the first embodiment.

In a cooling operation, the cooling of the vehicle interior is performed. The cooling operation is started by operation of a switch by a user of the vehicle. The refrigerant circuit 10 is controlled such that the compressor 11 is operated with the opening/closing valve 15*a* opened while the three-way valve 15*b* connects the exterior heat exchanger 16 to the fixed throttle 19. The refrigerant circuit 10 allows the refrigerant to flow as indicated by the solid arrow of FIG. 4. The coolant circuit 40 is controlled such that when the coolant temperature Tw is higher than the reference temperature, the three-way valve 42 allows the coolant to flow into the radiator 43, and that when the coolant temperature Tw is lower than the reference temperature, the three-way valve 42 causes the coolant to bypass the bypass passage 44. FIG. 4 shows the flow of coolant when the coolant temperature Tw is higher than the reference temperature as indicated by the dashed arrow.

In the refrigerant circuit 10, the high-pressure refrigerant discharged from the compressor 11 flows into the interior condenser 12 to exchange heat with the air UR, thereby dissipating heat therefrom. The high-pressure refrigerant flowing from the interior condenser 12 flows into the exterior heat exchanger 16 via the passage 14. The high-pressure refrigerant flowing into the exterior heat exchanger 16 dissipates heat into the air AR blown by the blower fan 17. The refrigerant flowing from the exterior heat exchanger 16 is decompressed and expanded by the fixed throttle 19. The refrigerant flowing from the fixed throttle 19 flows into the interior evaporator 20 to absorb heat from the air UR, thereby evaporating itself. Thus, the air UR is cooled. The refrigerant flowing from the interior evaporator 20 flows into the accumulator 18 to be separated into liquid and vapor phases, and is then sucked into and compressed by the compressor 11 again.

Figure 5:
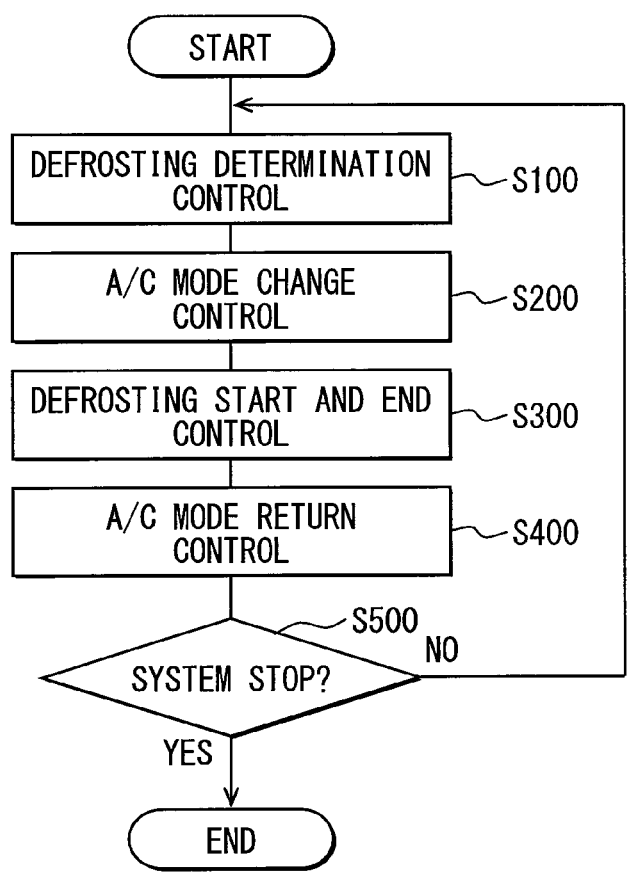
FIG. 5 is a flowchart showing a defrosting control of the heat pump cycle in the first embodiment.

FIG. 5 is a flow chart showing the control for transfer to the defrosting control to be performed during the heating operation. In step S100, it is determined whether or not the frost formed on the exterior heat exchanger 16 is removed by defrosting. In step S200, an air conditioning mode of the air conditioning unit 30 is controlled so as to suppress a change in air conditioned state under the defrosting control. In step S300, the defrosting control is performed. In step S300, the start and end of the defrosting control are controlled. In step S400, the air conditioning unit 30 is returned to an air conditioning mode obtained before the start of the defrosting operation. In step S500, it is determined whether the stopping of the air conditioner 1 is required or not. When the stopping of the air conditioner 1 is not required, the operation returns to step S100. When the stopping of the air conditioner 1 is required, the control is ended.

Figure 6:
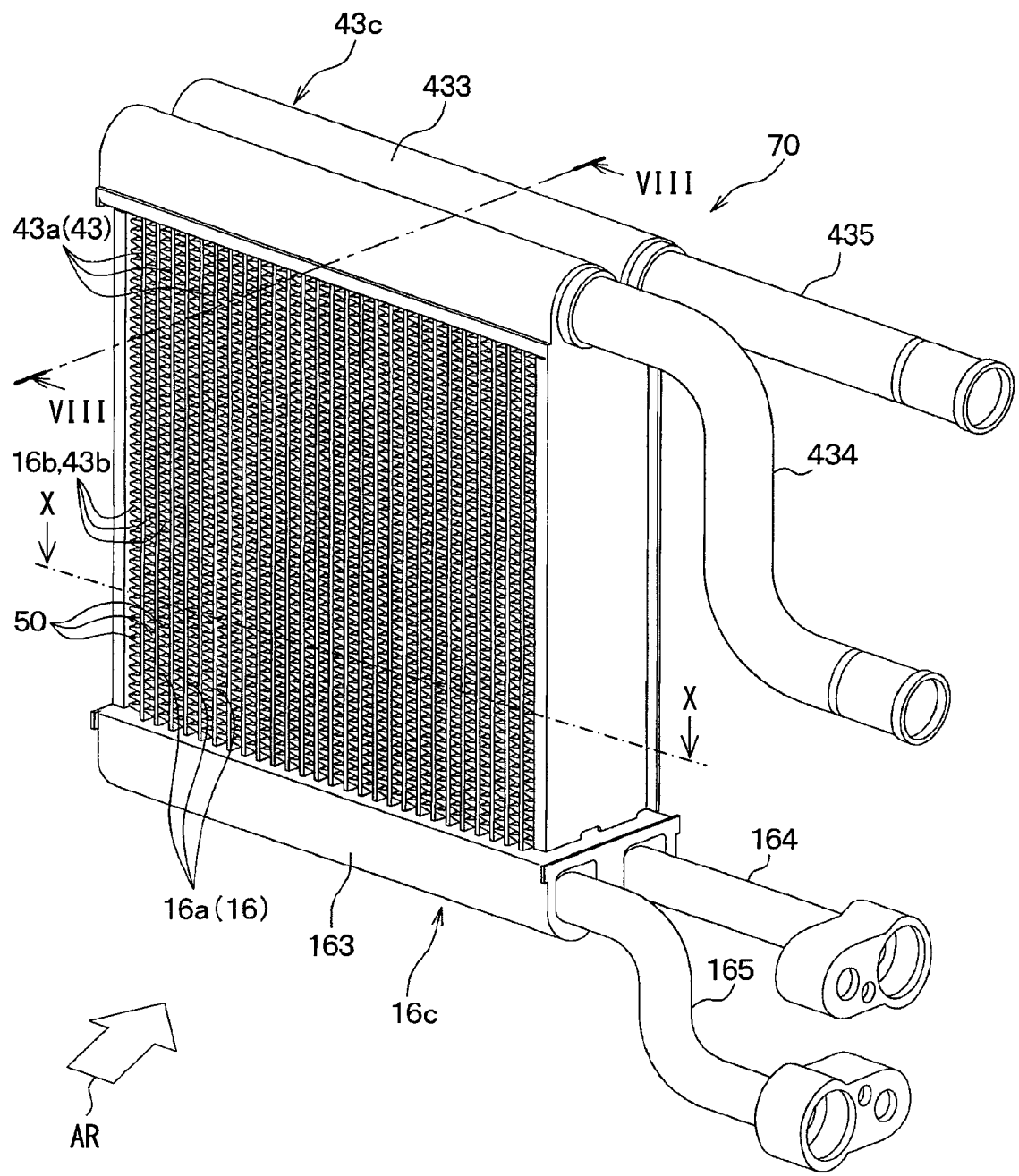
FIG. 6 is a perspective view of a heat exchanger in the first embodiment.
Figure 7:
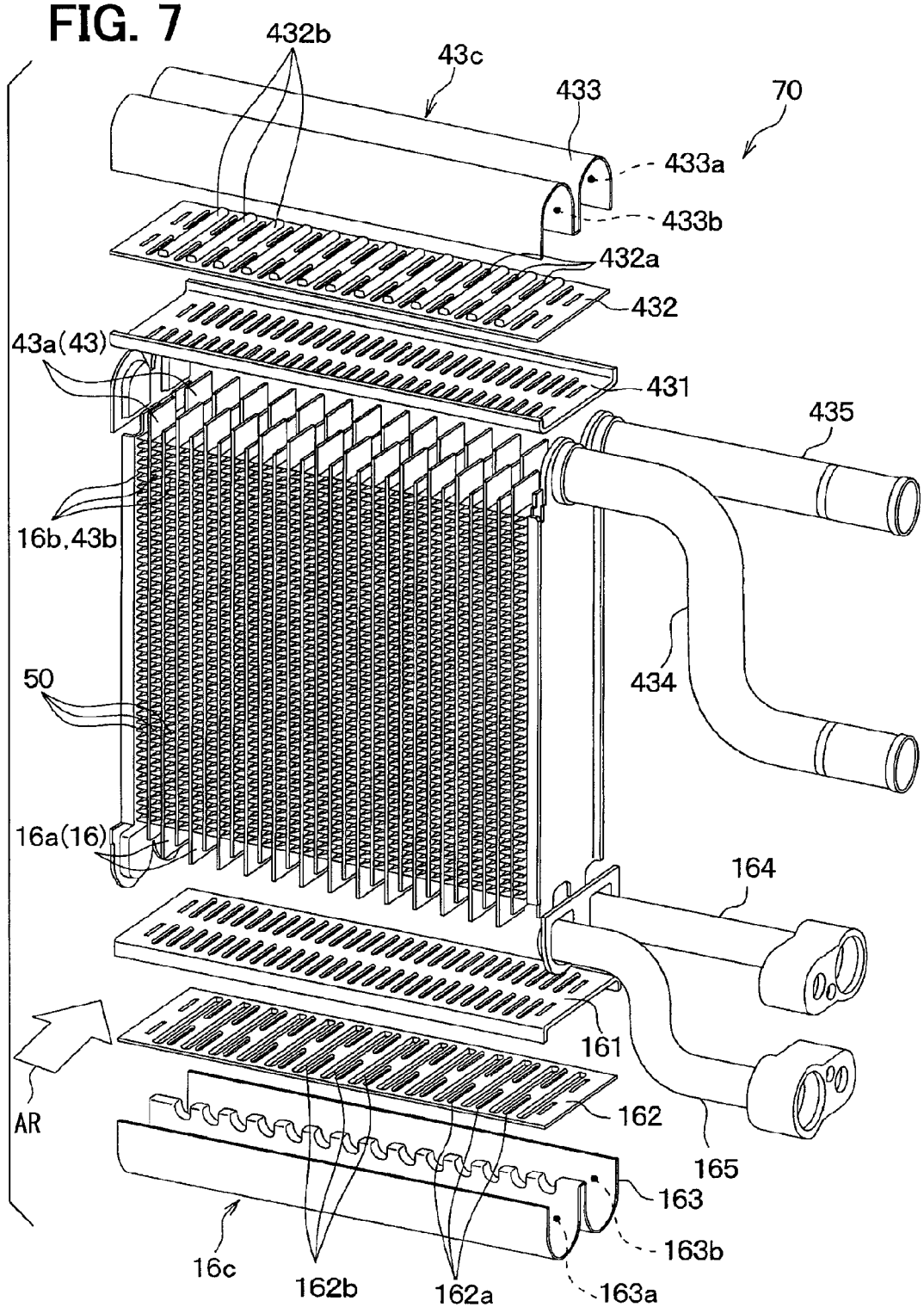
FIG. 7 is an exploded view of the heat exchanger in the first embodiment.

Referring to FIGS. 6 to 10, the heat exchanger 70 is the so-called tank and tube heat exchanger. As shown in FIGS. 6 and 7, the refrigerant tubes 16*a* and the water tubes 43*a* are arranged in two lines along the flow direction of the air AR. The refrigerant tubes 16*a* and the water tubes 43*a* are alternately arranged in both the upstream line and the downstream line. Thus, the air passages 16*b* for heat absorption and the air passages 43*b* for heat dissipation are shared. In the shared passages 16*b* and 43*b*, the fins 50 are disposed.

The fins 50 are bonded to the tubes 16*a* and 43*a* adjacent to each other. The tubes 16*a*, the tubes 43*a*, and the fins 50 are stacked on each other and bonded to form a heat exchange portion. The heat exchange portion serves to exchange heat among a plurality of fluids, for example, three fluids including the refrigerant RF, the coolant WT, and the air AR.

A first tank 16*c* for collecting or distributing the coolant and refrigerant is disposed on one end side in the longitudinal direction of each of the tubes 16*a* and tubes 43*a*, specifically, on the lower side of the figure. The first tank serves to receive and discharge the refrigerant, and thus can be called a refrigerant tank. The first tank provides a connection portion for guiding the coolant from one water tube 43*a* to another water tube 43*a*.

The first tank 16*c* includes a connection plate 161 connected to the refrigerant tubes 16*a* and the water tubes 43*a* arranged in two lines, an intermediate plate 162 fixed to the connection palate 161, and a first tank member 163. The connection plate member 161 is provided with through holes penetrating from the front side to the back side and positioned corresponding to the tubes 16*a* and 43*a*. The tubes 16*a* and 16*b* penetrate the plate member via the through holes and are fixed thereto.

Through holes 162*a* are provided to penetrate the intermediate plate 162 from the front side to the back side thereof in positions corresponding to the refrigerant tubes 16*a*. Each refrigerant tube 16*a* penetrates the plate through the through hole 162*a*. In the first tank 16*c*, the refrigerant tube 16*a* protrudes toward the first tank 16*c* side rather than the water tube 43*a*. The first tank 163 is fixed to the connection plate 161 and the intermediate plate 162 to form therein a collection space 163*a* for collecting the refrigerant and a distribution space 163*b* for distributing the refrigerant. The first tank 163 is formed in a W-like shape as viewed in the longitudinal direction by pressing a flat metal plate. The center of the first tank 163 is bonded to the intermediate plate member 162. The collection space 163*a* and the distribution space 163*b* are independently partitioned from each other. The collection space 163*a* is positioned on the upstream side of the air AR, and the distribution space 163*b* is positioned on the downstream side thereof.

Plate-like lids are fixed to both ends of the first tank 163 in the longitudinal direction. An inlet pipe 164 for introducing the refrigerant thereinto is connected to one end of the distribution space 163*b*. An outlet pipe 165 for flowing out the refrigerant is connected to one end of the collection space 163*a*.

A second tank 43*c* for collecting or distributing the coolant and refrigerant is disposed on the other end side in the longitudinal direction of each of the tubes 16*a* and tubes 43*a*, specifically, on the upper side of the figure. The second tank serves to receive and discharge the coolant, and thus can be called a water tank. The second tank provides a connection portion for guiding the refrigerant from one refrigerant tube 16*a* to another refrigerant tube 16*a*.

The second tank 43*c* basically has the same structure as that of the first tank 16*c*. The second tank 43*c* includes a connection plate member 431, an intermediate plate member 432, and a second tank member 433. Through holes 432*a* are provided to penetrate the intermediate plate member 432 from the front side to the back side thereof in positions corresponding to the water tubes 43*a*. Each water tube 43*a* penetrates the corresponding through hole 432*a*, and is fixed thereto. In the second tank 43*c*, the water tube 43*a* protrudes toward the second tank 43*c* rather than the refrigerant tube 16*a*. The second tank member 433 has a collection space 433*a* for collecting the coolant and a distribution space 433*b* for distributing the cooling medium. The distribution space 433b is positioned on the upstream side of the air AR, and the collection space 433a is positioned on the downstream side thereof.

Plate-like lids are fixed to both ends of the second tank member 433 in the longitudinal direction. An inlet pipe 434 for introducing the coolant thereinto is connected to one end of the distribution space 433b. An outlet pipe 435 for flowing out the refrigerant is connected to one end of the collection space 433a.

Figure 8:
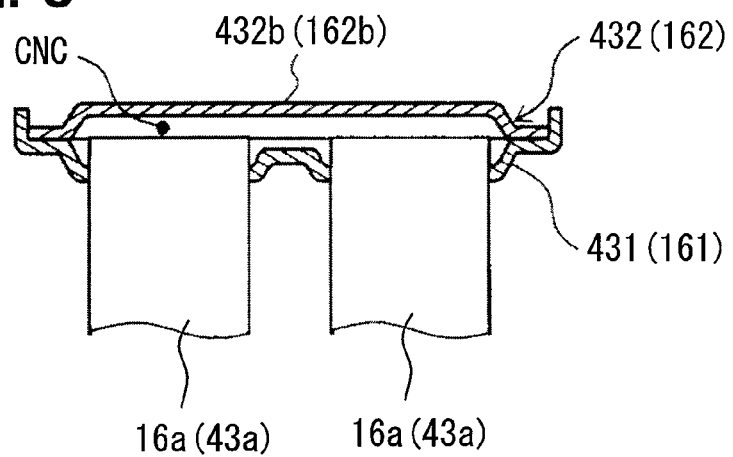
FIG. 8 is a cross-sectional view taken along the line VIII-VIII of FIG. 6.

As shown in FIG. 8, a space CNC is formed between the intermediate plate 162, 432 and the connection plate 161, 431 to provide a connection portion. A plurality of concave portions 162b and 432b are formed in the intermediate plates 162 and 432. The concave portions 162b and 432b form a plurality of spaces CNC in communication with the tubes 43a and 16a between the intermediate plates 162 and 432 and the connection plates 161 and 431 by fixing the intermediate plates 162 and 432 to the connection plates 161 and 431. The space CNC formed between the intermediate plate member 162 and the connection plate 161 causes two water tubes 43a arranged in two lines in the flow direction of the air AR to communicate with each other. The space CNC formed between the intermediate plate member 432 and the connection plate 431 causes two refrigerant tubes 16a arranged in two lines in the flow direction of the air AR to communicate with each other.

Figure 9:
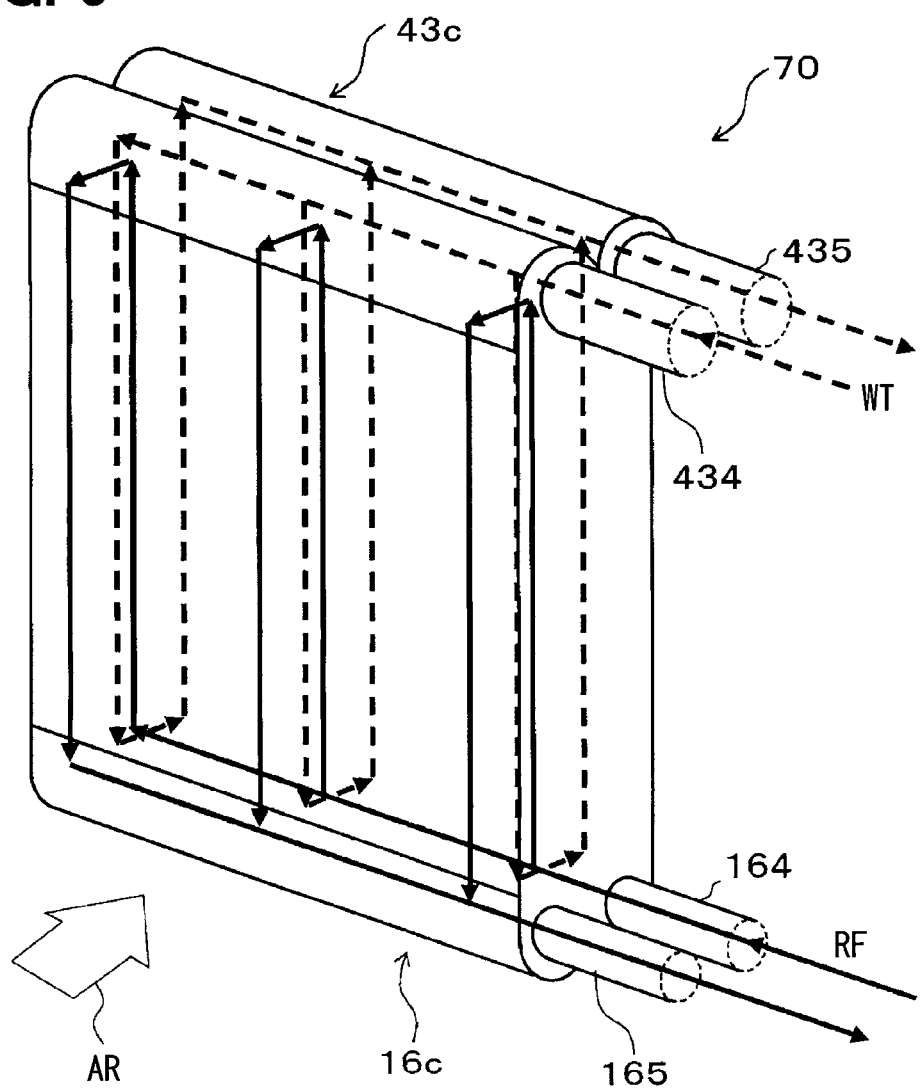
FIG. 9 is a schematic perspective view showing the flow of fluid in the heat exchanger of the first embodiment.

As shown in FIG. 9, the refrigerant RF and the coolant WT flow in opposite directions within most of the heat exchanger 70. The solid arrow indicates the flow of the refrigerant RF. The dashed arrow indicates the flow of the coolant WT.

The refrigerant RF flows into the distribution space 163b of the first tank 16c via the inlet pipe 164, and then into the refrigerant tubes 16a in the downstream line. The refrigerant flows from the lower side to the upper side of the refrigerant tubes 16a in the downstream line. The refrigerants flowing from the refrigerant tubes 16a in the downstream line flow into the refrigerant tubes 16a in the upstream line via the space CNC of the second tank 43c. The refrigerant flows through the refrigerant tubes 16a in the upstream line from the upper side to the lower side of the figure. The refrigerants flowing from the refrigerant tubes 16a in the upstream line are collected in the collection space 163a of the first tank 16c to flow from the outlet pipe 165. Thus, the heat exchanger 70 allows the refrigerant to make a U-turn from the downstream line to the upstream line.

The coolant WT flows into the distribution space 433b of the second tank 43c via the inlet pipe 434, and then into the water tubes 43a in the upstream line. The coolant flows through the water tubes 43a in the upstream line from the upper side to the lower side of the figure. The refrigerants flowing from the water tubes 43a in the upstream line flow into the water tubes 43a in the downstream line via the space CNC of the first tank 16c. The coolant flows through the water tubes 43a in the downstream line from the lower side to the upper side of the figure. The coolants flowing from the water tubes 43a in the downstream line are collected in the collection space 433a of the second tank 43c to flow from the outlet pipe 435. Thus, the heat exchanger 70 allows the coolant to make a U-turn from the upstream line to the downstream line.

The refrigerant tubes 16a and the water tubes 43a are arranged such that one refrigerant tube 16a is arranged adjacent to one water tube 43a via the fin 50. This arrangement are effective at transferring heat effectively from the water tubes 43a to the frost growing near the refrigerant tubes 16a. One refrigerant tube 16a is disposed between two water tubes 43a in at least a part of the upstream line of the heat exchanger 70. Further, one water tube 43a is disposed between two refrigerant tubes 16a in at least a part of the upstream line of the heat exchanger 70. In other words, the refrigerant tubes 16a and the water tubes 43a are alternately arranged at least in the upstream line. Further, the refrigerant tubes 16a and the water tubes 43a can be alternately arranged also in the downstream line.

The air passage 16b for causing the refrigerant tube 16a to absorb heat therein and the air passage 43b for causing the water tube 43a to dissipate heat therefrom are provided by a common air passage. Thus, the frost growing near the refrigerant tube 16a can be effectively removed by heat from the water tube 43a.

Figure 10:
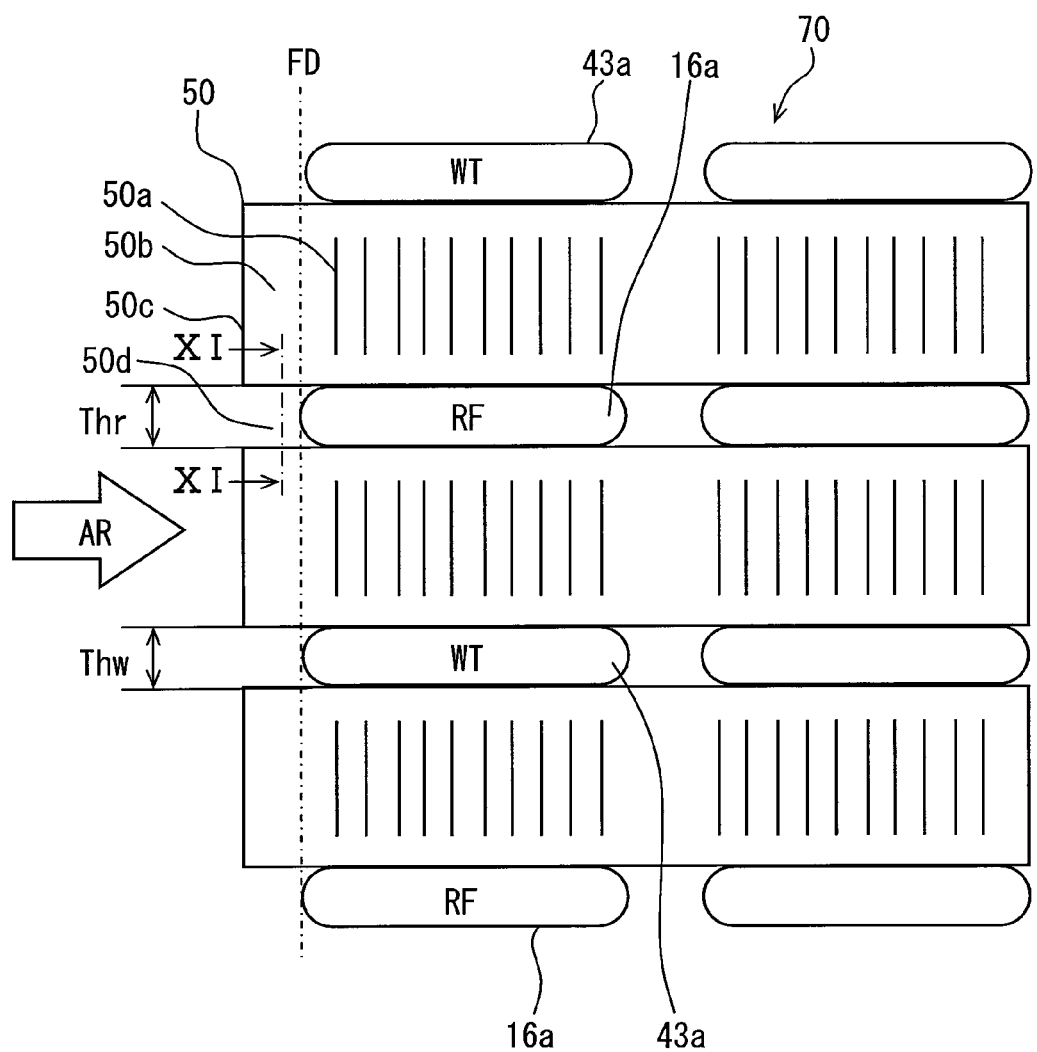
FIG. 10 is a schematic cross-sectional view taken along the line X-X of FIG. 6.

As shown in FIG. 10, the fins 50 include louvers 50a for promoting heat exchange with the air AR. The louvers 50a can be formed in a range corresponding to a gap between the tubes 16a and 43a. The fin 50 includes a protrusion 50b protruding toward the upstream side of the flow of the air AR with respect to the upstream end FD of each of the tubes 16a and 43a forming the upstream line. The protrusion 50b can be provided by a plate part without any louver 50a. The fins 50 include an upstream end 50c on the upstream side of the flow of the air AR. The fins 50 can be disposed to protrude toward the upstream side of the flow of the air AR.

The fin 50 on at least the water tube 43a side includes another protrusion 50b protruding toward the upstream side of the flow of the air AR rather than the water tube 43a. The protrusion 50b has its side portion on the water tube 43a side. The side portion includes a tip surface of a peak portion and an opening of a valley portion of the fin 50. The side portion of the protrusion 50b is positioned near the water tube 43a, and thus is unlikely to be covered with frost. Thus, even though the frost occurs, the air AR can be introduced from the side portion. This structure can suppress the closing of the air passage by the frost formation, thereby providing the heat exchanger 70 with excellent resistance to frost formation.

The two fins 50 disposed on both sides of the refrigerant tube 16a protrude toward the upstream side of the flow of the air AR with respect to the refrigerant tube 16a to form a clearance 50d. The clearance 50d is formed between the two fins 50 on the upstream side with respect to the tubes 16a and 43a therebetween. In other words, on the upstream side of the refrigerant tube 16a, the two fins 50 respectively have the protrusions 50b that form the clearance 50d therebetween for allowing the flow of melt water DW generated by defrosting. The fin 50 protrudes such that the clearance 50d can provide a discharge passage of the melt water DW generated by melting the frost attached to the protrusion 50b. The clearances 50d are formed on the upstream side of all the refrigerant tubes 16a disposed in the upstream line. The clearances 50d are also formed on the upstream side of all the water tubes 43a disposed in the upstream line.

Figure 11:
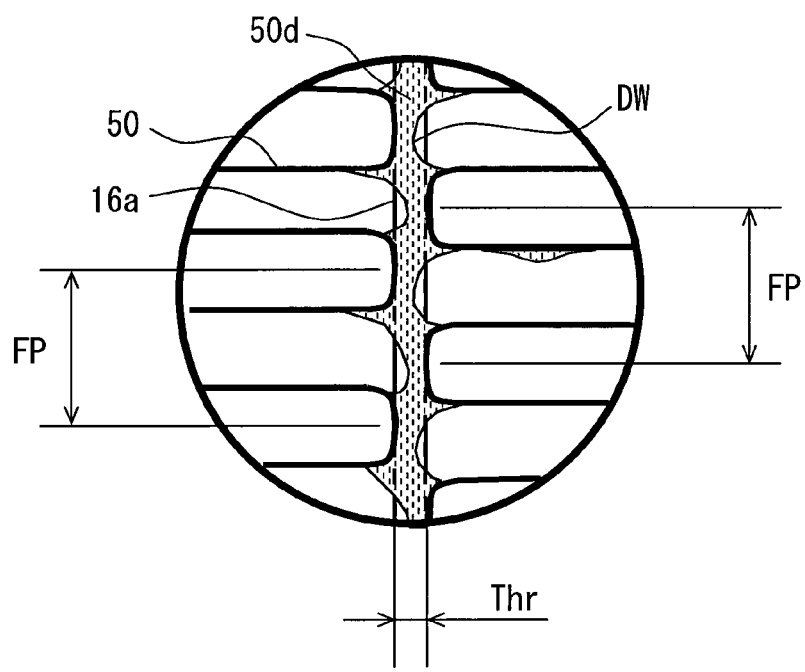
FIG. 11 is an enlarged cross-sectional view of a part of the section taken along the line XI-XI of FIG. 10.

As shown in FIG. 11, the tubes 16a and 43a are arranged to extend vertically in the direction of gravitational force. The clearance 50d extends along the refrigerant tubes 16a. Thus, the clearance 50d extends vertically in the direction of gravitational force with the heat exchanger 70 being set on the vehicle. The melt water is likely to flow by the gravitational force. The clearance 50d extends in the form of trench along the substantially entire length of the tubes 16a and 43a.

The clearance 50d has a width corresponding to each of widths Thr and Thw of the tube 16a and 43a. The refrigerant tube 16a has the width Thr. The water tube 43a has the width Thw. In this embodiment, the width Thr is the same as the width Thw. Each width Thr or Thw of the tube 16a or 43a is smaller than a half an average pitch Fp of the fin 50. The width Thr of the refrigerant tube 16a is smaller than a half of a pitch Fp of the fin 50 (Thr<Fp/2). In this embodiment, the following relationships is set: Thr<Fp/2, and Thw<Fp/2. A value Fp/2 corresponds to a width of one pleat of the fin 50. This structure contributes to promote the discharge of the melt water DW from the pleat of the fin 50 into the clearance 50d. With this structure, the width of the clearance 50d formed between the protrusions 50b corresponds to the width Thr of the refrigerant tube 16a, and thereby the width of the clearance 50d can be smaller than a half of the fin pitch Fp. As a result, the melt water tends to flow through the clearance 50d. Thus, the melt water can be prevented from being stored in between the pleats of the corrugated fin 50.

A plurality of peak portions and valley portions of the fins 50 are positioned opposed to each other on both sides of the clearance 50d. For example, the valley portion of the right fin 50 and the peak portion of the left fin 50 vertically correspond to each other. The melt water DW flows and falls over the peak portions. The melt water DW sometimes forms a water drop over the surface of the fin 50 by surface tension. The peak portions positioned on both sides of the clearance 50d are positioned close to each other such that the water drop of the melt water DW moves from one peak portion to another.

The two fins 50 positioned on both sides of the refrigerant tube 16a have the peak portions of the fin 50 disposed substantially alternately on each other in a large range of both sides of the refrigerant tube 16a. The peak portions are alternately positioned on both sides of the refrigerant tube 16a along the vertical direction. The fins 50 is likely to be deformed, and thereby it is difficult to achieve the alternate arrangement in the entire region of the refrigerant tubes 16a. By setting the number of peak portions of the fins 50, and setting the positions of the fins 50, the above-mentioned alternate arrangement can be achieved in many ranges of the refrigerant tube 16a in the longitudinal direction, for example, in a range larger than a half thereof. The structure contributes to promote the flow of the melt water DW from the upper side to the lower side within the clearance 50d. The melt water flowing from the upper side to the lower side falls and drops while transversely being in contact with the peak portions positioned on both sides thereof. As a result, the melt water can be suppressed from being stored as a water drop in the clearance 50d.

Figure 12:
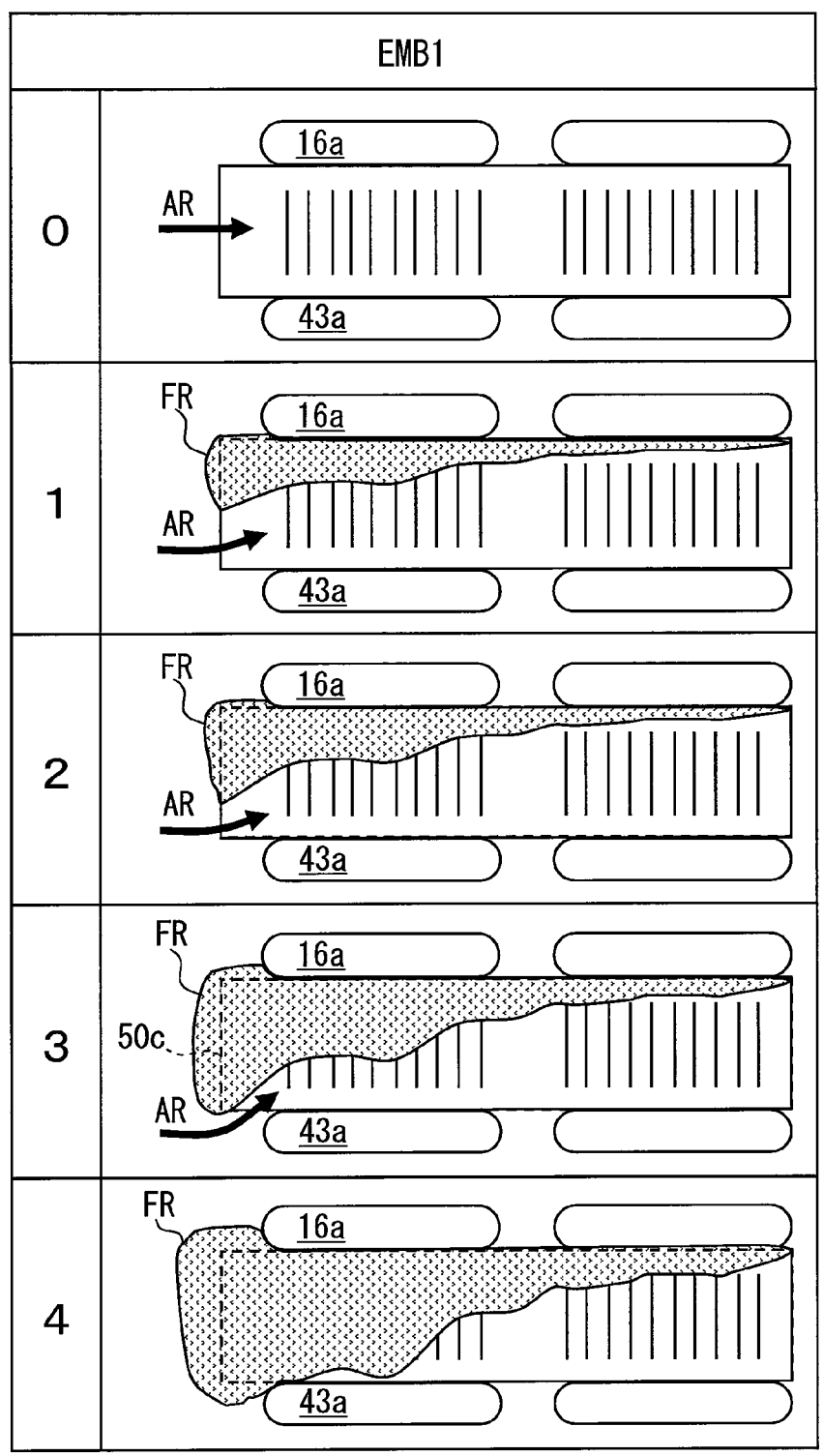
FIG. 12 is a schematic diagram showing the growth of frost on the heat exchanger in the first embodiment.
Figure 13:
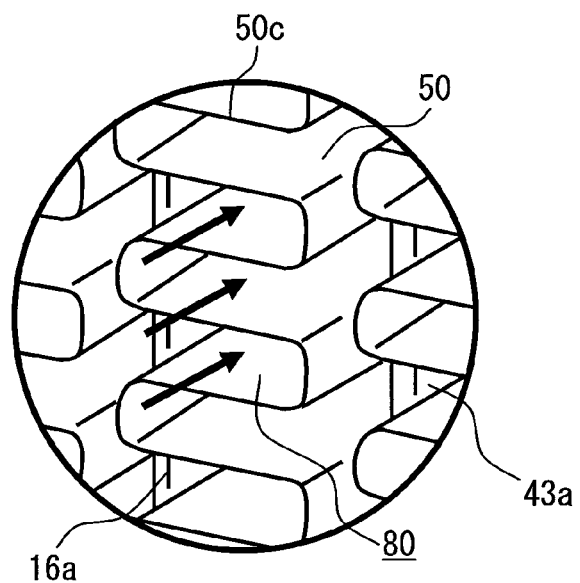
FIG. 13 is an enlarged perspective view of a part of the heat exchanger in the first embodiment.

FIG. 12 shows the process of growth of a core of frost FR on the fin 50 from a stage 0 to a stage 4. In the stage 0, no frost is attached. FIG. 13 is a perspective view corresponding to the stage 0. In the stage 0, the air AR straightly flows from an opening formed between the upper ends 50c of the fins 50. Thus, in the stage 0, the entire fins 50 can contribute to the heat exchange without being interrupted by the frost.

When the refrigerant tube 16a is cooled in the heating operation, the core of frost FR gradually grows. As shown in the stages 1 to 4, the core of frost FR gradually grows from the surface of the fin 50. The core of frost FR starts growing from the vicinity of the refrigerant tube 16a. The core of frost FR gradually grow from the refrigerant tube 16a toward the water tube 43a adjacent thereto. As a result, during a growth process of the core of frost FR, the core of frost FR is formed to be thick near the refrigerant tube 16a and to be thin near the water tube 43a. As a result, the core of frost FR gradually closes the air passage over the fin 50 from the vicinity of the refrigerant tube 16a toward the water tube 43a.

The core of frost FR grows thickly and largely in the upstream side of the air AR rather than the downstream side thereof. This is because the air AR with high humidity is supplied from the upstream side. As a result, the core of frost FR gradually closes the air passage on the fin 50 from the upstream side to the downstream side. Further, the core of frost FR extends toward the upstream side of the air AR from the upstream end 50c of the fin 50. As a result, the core of frost FR grows thickly around the upstream end 50c of the fin 50.

In the stages 1 and 2, the thick core of frost FR is formed over the upstream end 50c. The air AR can still flow from between the upstream ends 50c. The valley portion between the peak portions of the fins 50 is opened at the side surface of the fin 50. In other words, the fin 50 is opened in the direction perpendicular to the flow direction of air AR, that is, in the line direction of the tubes 16a and 43a, on the upstream side of the tubes 16a and 43a. Thus, a part of the air AR flows into the air passages 16b and 43b from the side portions of the fins 50. As a result, after the formation of the core of frost FR, an inlet for the air AR into the air passages 16b and 43b is kept large. Thus, even though the core of frost FR grows, the decrease in flow rate of the air AR is reduced, thereby suppressing the degradation in the heat exchange performance of the heat exchanger 70 due to the attachment of the frost.

Figure 14:
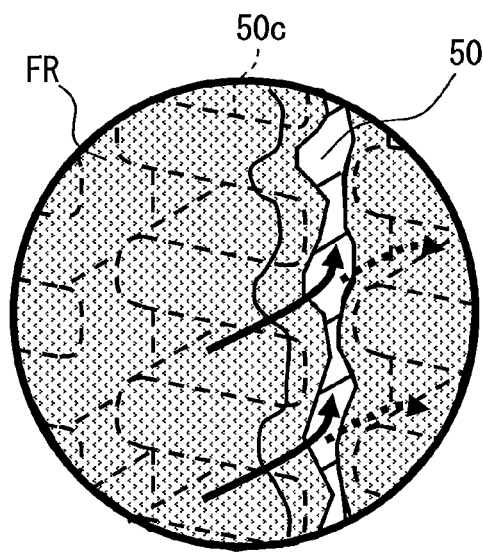
FIG. 14 is another enlarged perspective view of the part of the heat exchanger in the first embodiment.

When the core of frost FR further grows, a gap between the upstream ends 50c is completely closed. Even though the core of frost FR closes the gap between the upstream ends 50c, the air AR can flow into the air passages 16b and 43b via the side portions of the fins 50 on the upstream side of the water tube 43a. FIG. 14 shows a perspective view corresponding to the stage 3. As shown in the figure, once the frost formation progresses, the core of frost FR closes the gap between the upstream ends 50c. In some cases, the openings of the ends of the fins 50 are substantially completely closed. Also in this state, the inlet for the air AR is maintained on the upstream side of the flow of the air AR with respect to the water tube 43a adjacent to the refrigerant tube 16a. Thus, even when the core of frost FR grows, the decrease in flow rate of the air AR is suppressed, thereby suppressing the degradation of the heat exchange performance of the heat pump cycle 70 due to the attachment of the frost.

When the frost FR further grows, the core of frost FR reaches the adjacent water tube 43a, thereby completely closing the air passages 16b and 43b. The stage 4 indicates the state where the air passages are completely closed.

The amount of protrusion of the fin 50 is set so as to let the air AR flow thereinto from the side portion of the fin 50, as shown in the stage 3. That is, even though the end facing the upstream side of the air flow is closed by the core of frost FR, the fin 50 is protruded such that the air AR can be introduced from the end of the protrusion 50b to the air passage 16b and 43b. In other words, the fin 50 protrudes such that the core of frost FR closes the upstream end space 80 provided near the upstream end 50c by corrugating the fins 50 before the core of frost FR reaches the adjacent water tube 43a during the growth process of the core of frost FR. As a result, even if the frost grows to cover the ends on the upstream sides of the fins, the air can be introduced from its side portion.

In this way, this embodiment can suppress the reduction in heat exchange performance of the heat exchanger 70 due to the attachment of the frost. In other words, the resistance to frost formation is improved.

Figure 15:
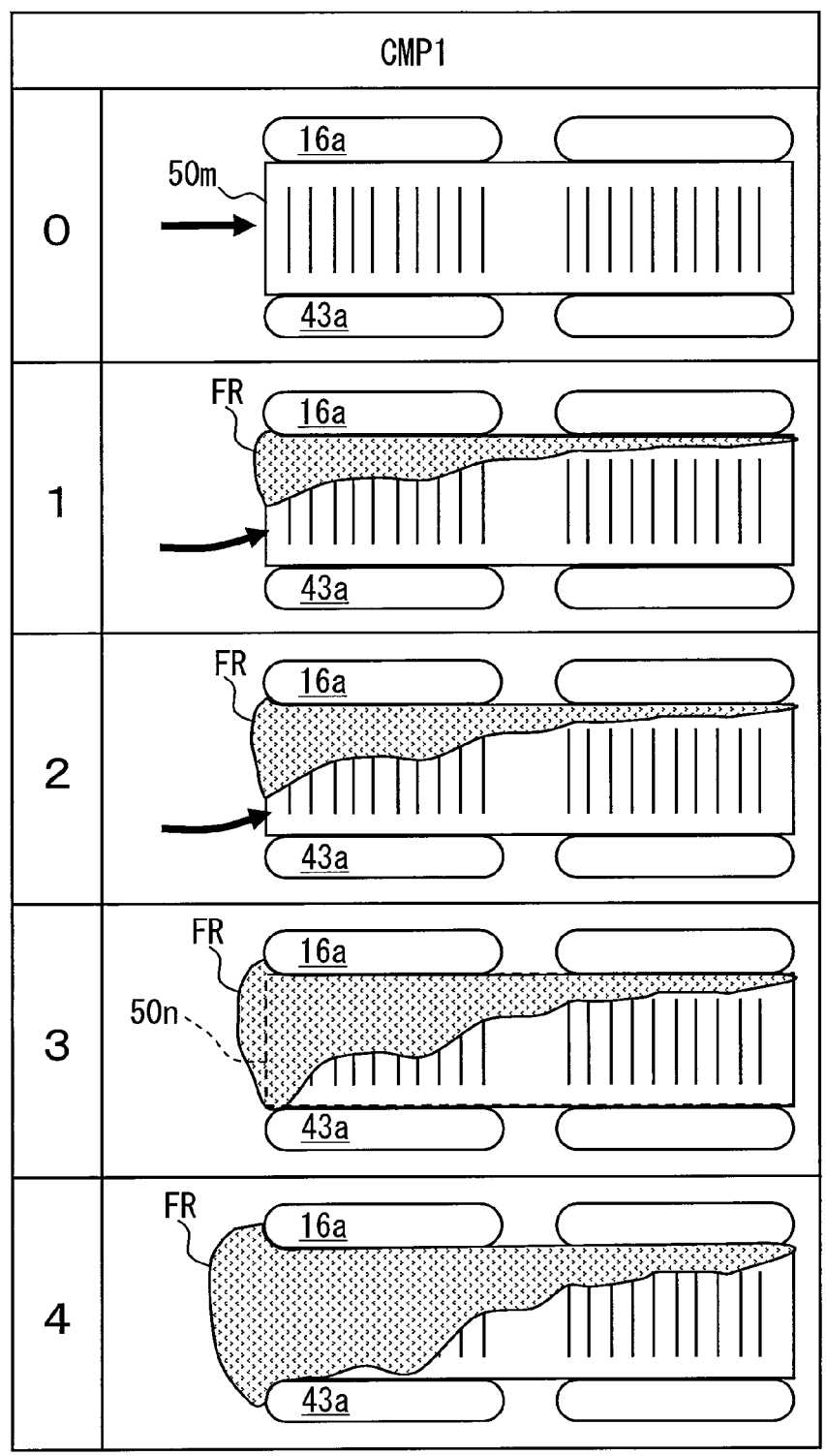
FIG. 15 is a schematic diagram showing the change in form of the frost on a heat exchanger in a first comparative example.

FIG. 15 shows a first comparative example CMP1 for comparison with the first embodiment. In the first comparative example, the fin 50m is used. The fin 50m does not have a protrusion. When the core of frost FR grows, the core of frost FR reaches the adjacent water tube 43a in the stage 3. In the first comparative example, the upstream end 50n of the fin 50m is not protruded yet. Thus, the core of frost FR closes the upstream end 50n, and at the same time, the core of frost FR reaches the water tube 43a. Thus, the inflow of the air AR into the air passages 16b and 43b is inhibited. As can be seen from the comparison between FIGS. 12 and 15, in this embodiment, the upstream end 50c of the fin 50 protrudes from the tubes 16a and 43a in the upstream line. As a result, it can reduce the closing of the air passages 16b and 43b.

Figure 16:
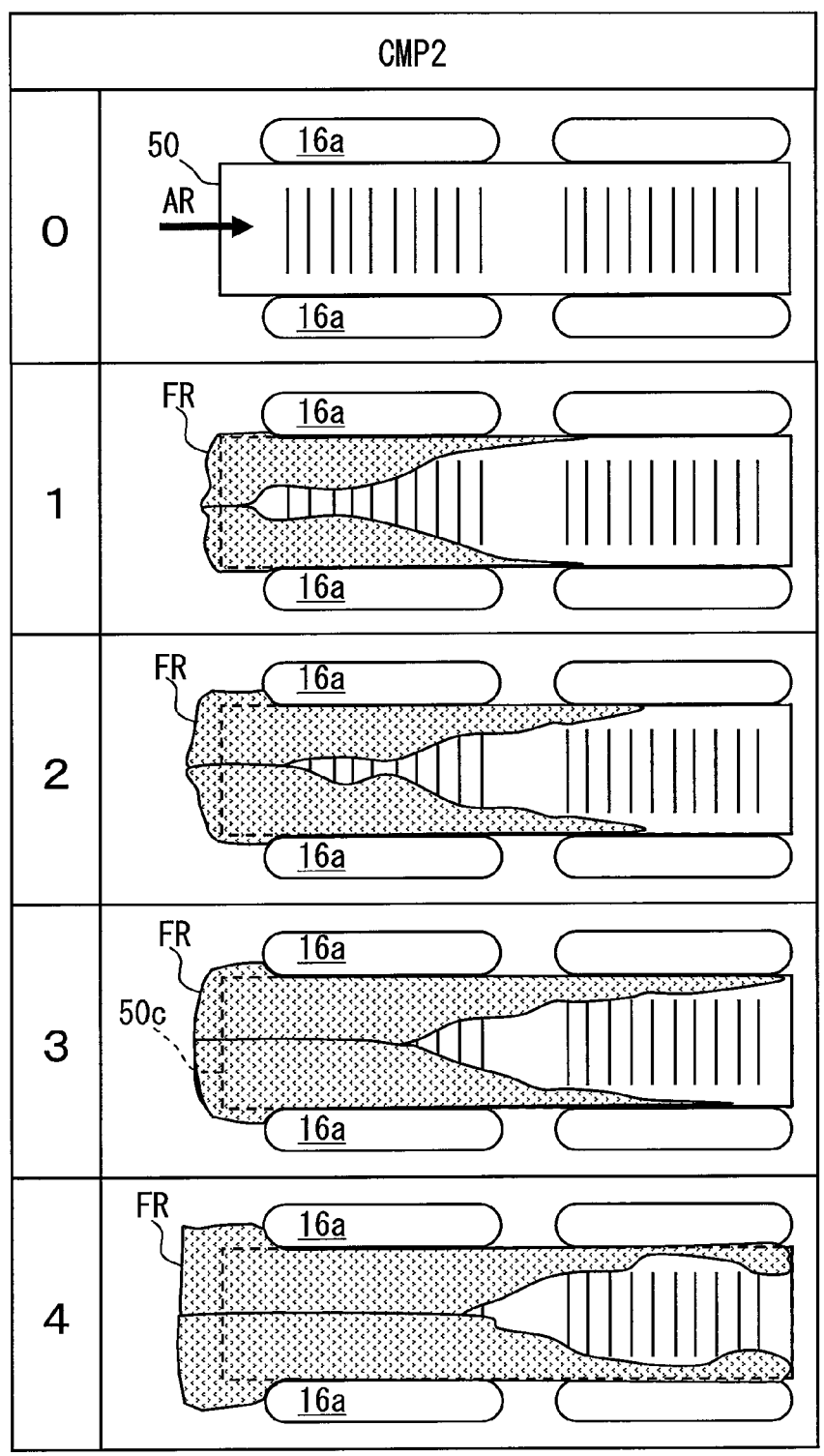
FIG. 16 is a schematic diagram showing the change in form of the frost on a heat exchanger in a second comparative example.

FIG. 16 shows a second comparative example CMP2 for comparison with the first embodiment. In the second comparative example, the fin 50 is used. However, in the second comparative example, the upstream line is comprised of only the refrigerant tubes 16a. The core of frost FR grows on both sides of the fin in the second comparative example. Thus, in the stage 1, all air passages 16b on the fins 50 are closed. Further, when the upstream line includes only the refrigerant tubes 16a, the frost occurs and concentrates only on the upstream line. Thus, the air passage 16b is earlier closed. As can be seen from the comparison between FIGS. 12 and 16, the closing of the air passage 16b is suppressed by arranging the refrigerant tube 16a and the water tube 43a adjacent to each other in at least a part of the upstream line. Additionally, the refrigerant tubes 16a are distributed in a wide range of the heat exchanger 70, so that the frost generated is widely distributed over the heat exchanger 70. As a result, the closing of the air passage 16b and 43b is suppressed.

Figure 17:
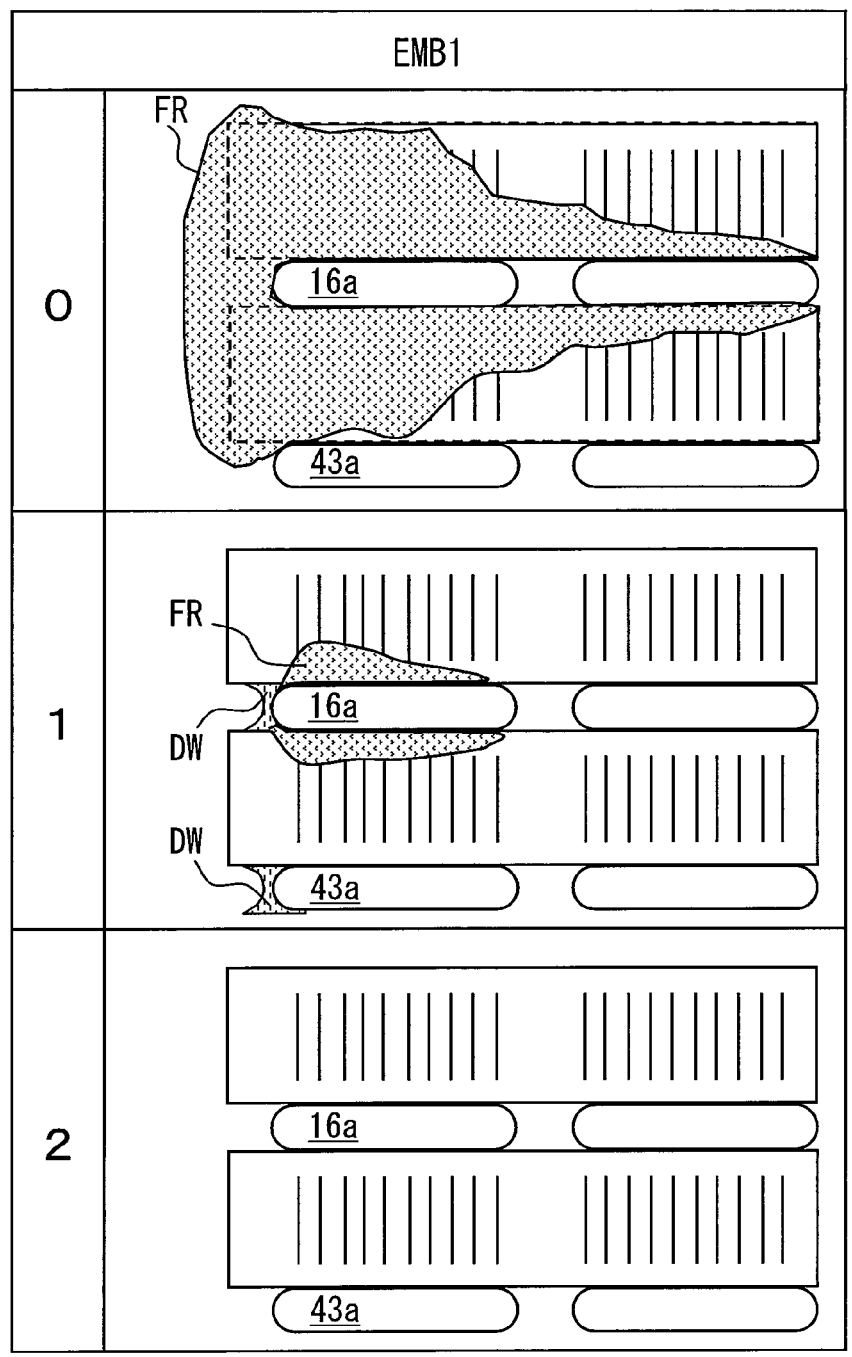
FIG. 17 is a schematic diagram showing contraction of the frost on the heat exchanger in the first embodiment.

FIG. 17 shows the process of contraction of the core of frost FR on the fin 50 from the stage 0 to the stage 2. In the stage 0, the air passages 16b and 43b are closed by the core of frost FR. In the defrosting operation, when warm water is supplied to the water tubes 43a, the core of frost FR is gradually contracted. As shown in the stage 1, the core of frost FR is contracted toward the vicinity of the refrigerant tube 16a. The stage 2 shows the state of completion of the defrosting.

The heat from the water tube 43a is transferred to the fin 50. Thus, the defrosting proceeds from the vicinity of the water tube 43a along the fin 50. The vicinity of the refrigerant tube 16a has a large heat capacity and is influenced by remaining refrigerant at a low temperature, so that the core of frost FR is likely to be left behind. Further, the heat from the water tube 43a is also transferred through the core of frost FR. As a result, the temperature of the core of frost FR is increased relatively quickly over the protrusion 50b with the core of frost FR grown largely. Consequently, the core of frost FR is quickly contracted over the protrusion 50b. In this embodiment, the protrusion 50b assists in growth of the core of frost FR in the position far away from the water tube 43a. However, also after the core of frost FR is largely grown over the protrusion 50b, the core of frost FR on the protrusion 50b is rapidly contracted, and thereby it does not lead to extension of the defrosting time due to the protrusion 50b.

In this embodiment, the amount of heat per unit time generated by the external heat source HS is small. The heat from the external heat source HS, however, is stored in the coolant circuit 40. The coolant circuit 40 can store a large amount of heat due to a heat capacity of the coolant used as the heat medium and a heat capacity of parts of the circuit. The coolant is supplied to the radiator 43 in the defrosting operation, and thereby it can supply the large amount of heat for defrosting. The coolant circuit 40 serves to keep at least one of the engine, an electric generator, an inverter circuit, a battery, and a control circuit at an appropriate temperature. The coolant circuit 40 can supply the large amount of heat per unit time for defrosting. For example, the amount of heat supplied by the coolant circuit 40 often reaches about ten times as much as that supplied to the refrigerant tubes 16a by operating the refrigerant circuit 10 as a hot gas cycle. In this embodiment, the defrosting can be performed using the large amount of heat depending on the heat stored in the coolant circuit 40. Even when the protrusion 50b is provided, the rapid defrosting can be performed.

When the core of frost FR is contracted, the melt water DW generated by melting the frost flows and drops over the surface of a member forming the heat exchanger 70. At least a part of the melt water DW flows and drops through the clearance 50d. The clearance 50d is formed adjacent to the protrusion 50b with the core of frost FR attached much. Thus, the clearance 50d provides a flow path for effectively flowing the melted water DW in the vicinity of the protrusion 50b.

In this embodiment, as mentioned above, the amount of heat per unit time supplied for defrosting is so large that the amount of melt water DW generated per unit time becomes large. The clearance 50d provides a flow path for effectively flowing the melt water DW in such a large amount.

The defrosting is likely to progress at the protrusion 50b, and thus the clearance 50d serves as a drainage from the initial period of the defrosting. The clearance 50d positioned on the upstream side of the water tube 43a provides an effective drainage at the initial period of the defrosting. Further, the clearance 50d positioned on the upstream side of the refrigerant tube 16a provides another effective drainage from intermediate period to the latter period of the defrosting.

The heat supplied from the water tube 43a is used for melting the frost. However, the heat supplied from the water tube 43a is also taken by the melt water DW after the frost melts. In this embodiment, the clearance 50d promotes the outflow of the melting water DW, thereby preventing the melt water DW from removing the heat supplied from the water tubes 43a. Thus, the progress of the defrosting is further promoted. As a result, the defrosting operation can be ended at an earlier stage. Further, the heating operation can be restarted at the early stage. The water drops are prevented from remaining on the heat exchanger 70, and thereby it can reduce a decrease in air passage 16b or 43b due to re-freezing of the water drops.

Thus, this embodiment can quickly remove the frost, and it can shorten the time required for the defrosting and/or suppress the amount of heat required for the defrosting. In other words, the defrosting performance is improved.

Second Embodiment

This embodiment is a modified example of the previous embodiment as a basic embodiment. In this embodiment, the defrosting operation is performed only with heat from the coolant circuit 40. In addition, high-temperature refrigerant may flow through the refrigerant tubes 16a. Such a defrosting operation is called a hot gas defrosting operation. In this embodiment, the refrigerant circuit 10 supplies heat for defrosting by use of the refrigerant RF flowing through the refrigerant tube 16a during the defrosting operation.

Figure 18:
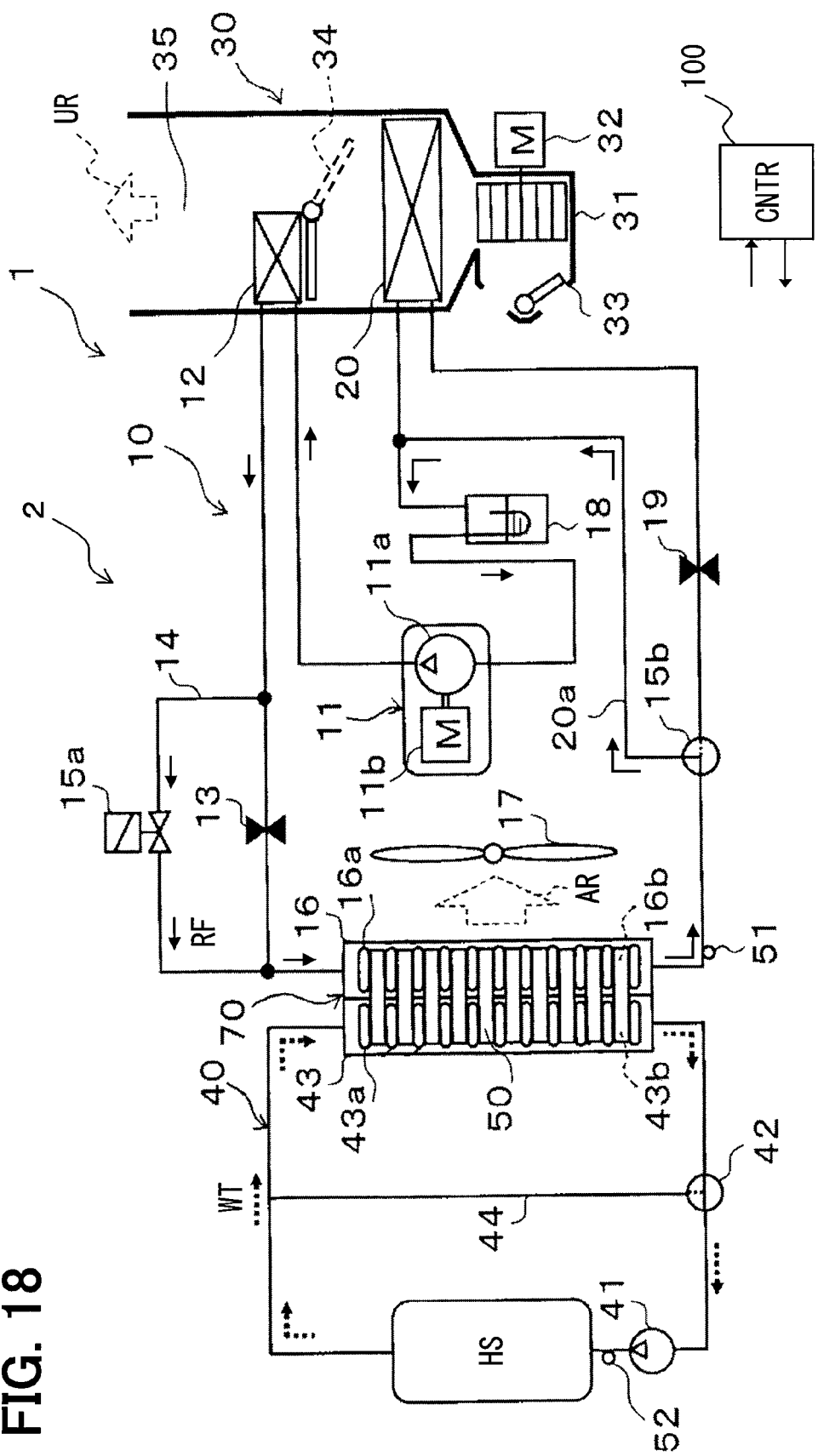
FIG. 18 is a schematic diagram showing a defrosting operation of a heat pump cycle in a second embodiment of the present disclosure.

FIG. 18 shows the flow of refrigerant in a hot gas defrosting operation. The air mix door 34 closes an air passage to the interior condenser 12 so as to suppress the heat exchange at the interior condenser 12. The refrigerant discharged from the compressor 11 flows into the exterior heat exchanger 16 at a high temperature through the valve 15a. A hot gas passage may be added which is adapted to introduce the high-temperature refrigerant discharged from the compressor 11 directly to the exterior heat exchanger 16.

Figure 19:
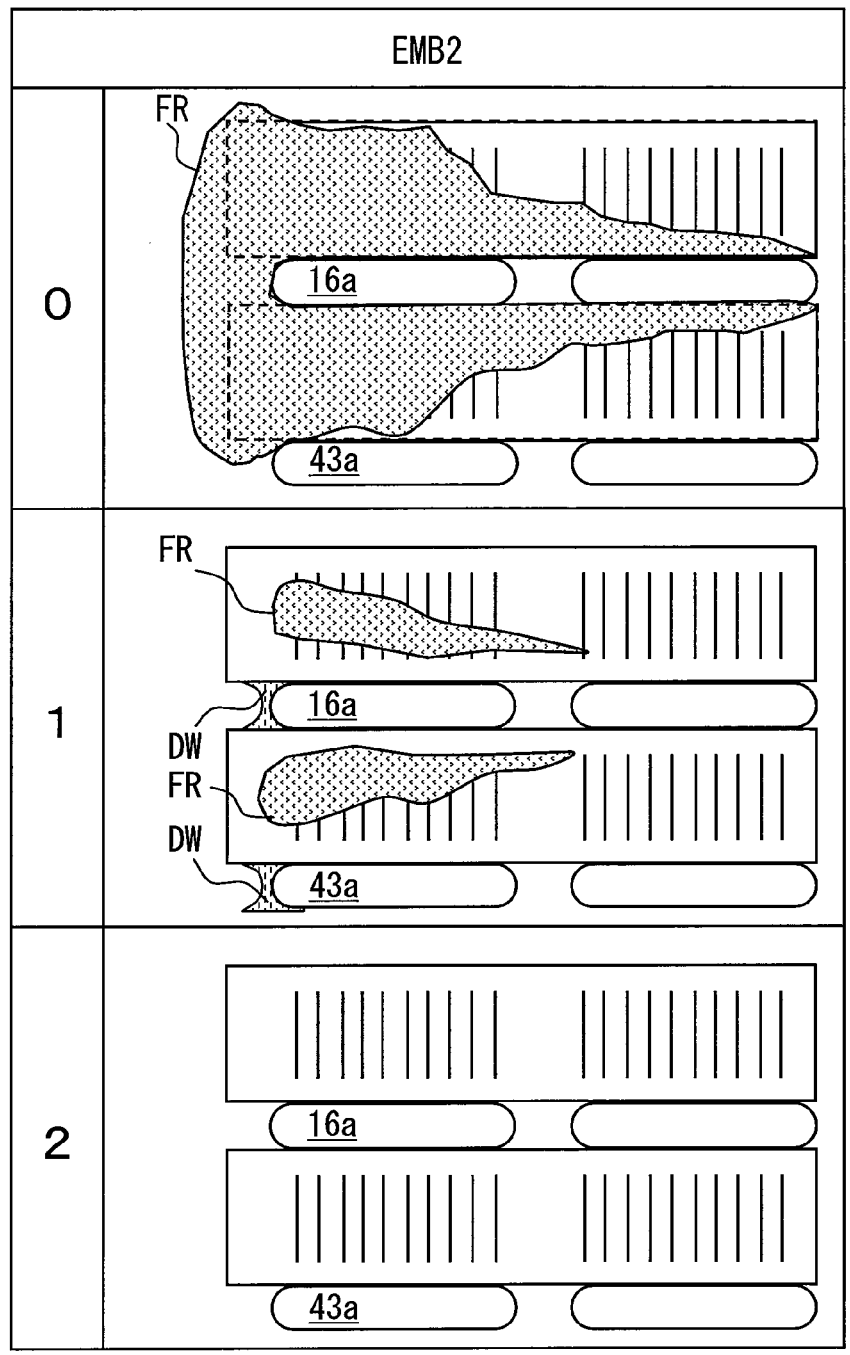
FIG. 19 is a schematic diagram showing contraction of the frost on the heat exchanger in the second embodiment.

FIG. 19 shows the process of contraction of the core of frost FR when the high-temperature water is supplied to the water tubes 43a and the high-temperature refrigerant is supplied to the refrigerant tube 16a in the defrosting operation. In this embodiment, the core of frost FR contracts from the water tube 43a to the refrigerant tube 16a, and at the same time, the core of frost FR contracts from the refrigerant tube 16a toward the water tube 43a. Also in this structure, the clearance 50d serves as a flow path for discharging the melt water DW. With this structure, the heat for defrosting is supplied from the water tubes 43a, while the heat for defrosting is also supplied from the refrigerant tube 16a. Thus, the defrosting performance is improved.

Third Embodiment

Figure 20:
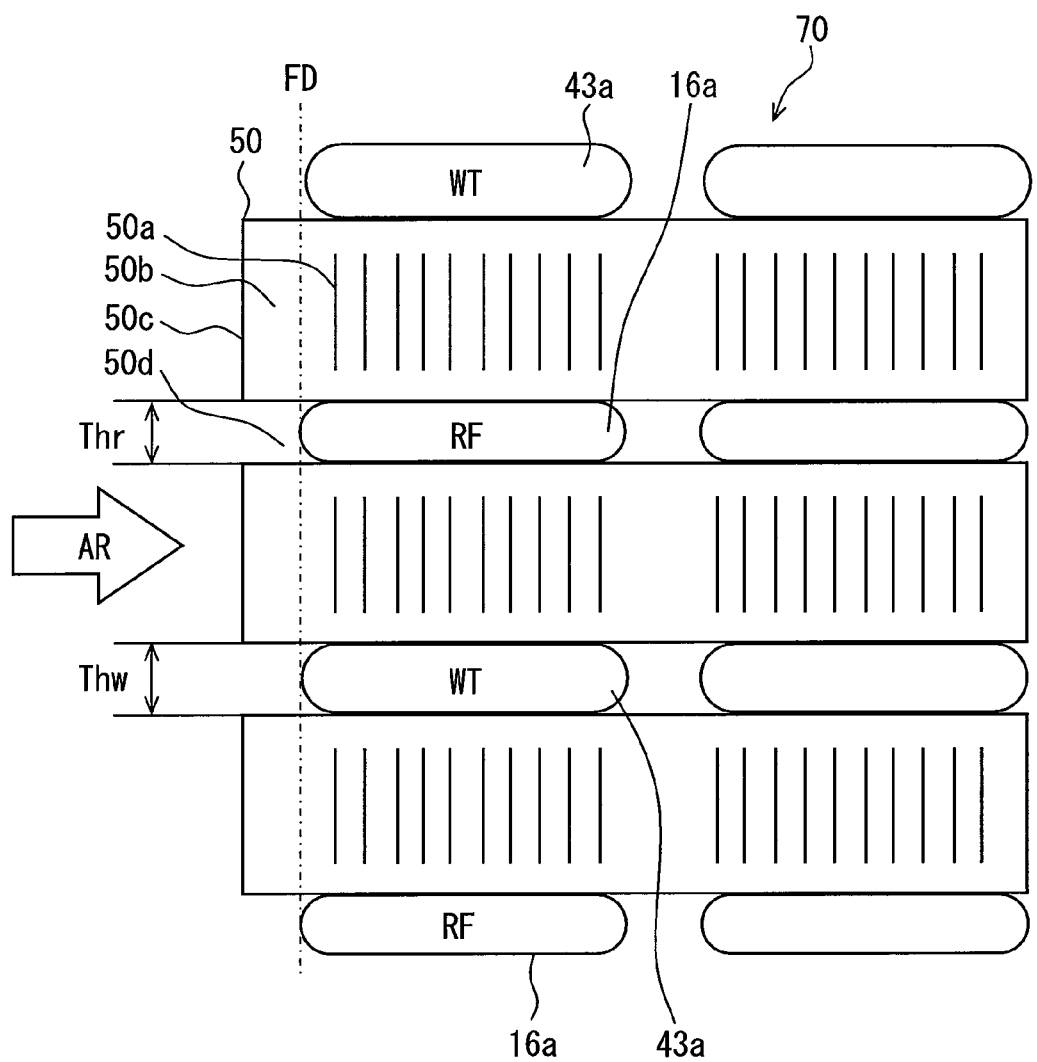
FIG. 20 is a schematic cross-sectional view of a heat exchanger in a third embodiment of the present disclosure.

This embodiment is a modified example of the previous embodiment as a basic embodiment. In this embodiment, the widths of the tubes 16a and 43a satisfy the following relationship: Thr=Thw. Instead of this, as shown in FIG. 20, the width Thr of the refrigerant tube 16a can be smaller than the width Thw of the water tube 43a (Thr<Thw). With this structure, the clearance 50d between the fins on the upstream side of the refrigerant tube 16a can be formed narrowly, whereas the clearance 50d between the fins on the upstream side of the water tube 43a can be formed widely. This structure makes a difference between drainage properties in front of the refrigerant tube 16a and in front of the water tube 43a. Thus, the distribution of drainage properties corresponding to the distribution of the melt water DW can be formed over the heat exchanger 70.

Fourth Embodiment

Figure 21:
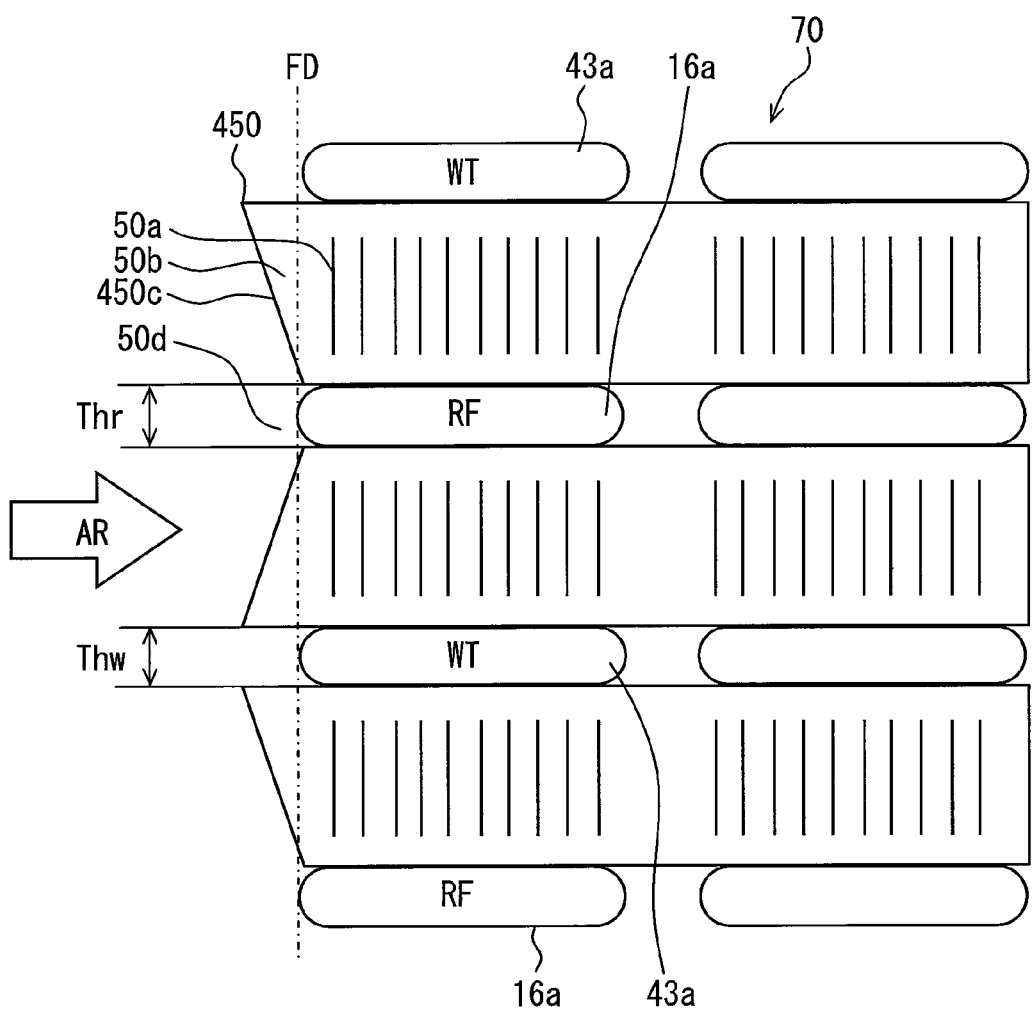
FIG. 21 is a schematic cross-sectional view of a heat exchanger in a fourth embodiment of the present disclosure.

This embodiment is a modified example of the previous embodiment as a basic embodiment. FIG. 21 is a cross-sectional view of a heat exchanger 70 of this embodiment. In this embodiment, instead of the fins 50, fins 450 are adopted. The fin 450 of this embodiment is protruded toward the upstream side of the flow of the air AR with respect to the water tube 43a on the water tube 43a side. In this embodiment, the fins 450 do not protrude from the refrigerant tube 16a with respect to the refrigerant tube 16a side. Thus, the fins 450 do not have clearances 50d for drainage partitioned on the upstream side of the refrigerant tube 16a.

The fin 450 has an upstream end 450c inclined with respect to the flow of the air AR. The upstream end 450c matches the upstream end FD on the refrigerant tube 16a side. The upstream end 450c protrudes toward the upstream side of the flow of the air AR rather than the upstream end FD on the water tube 43a side.

Figure 22:
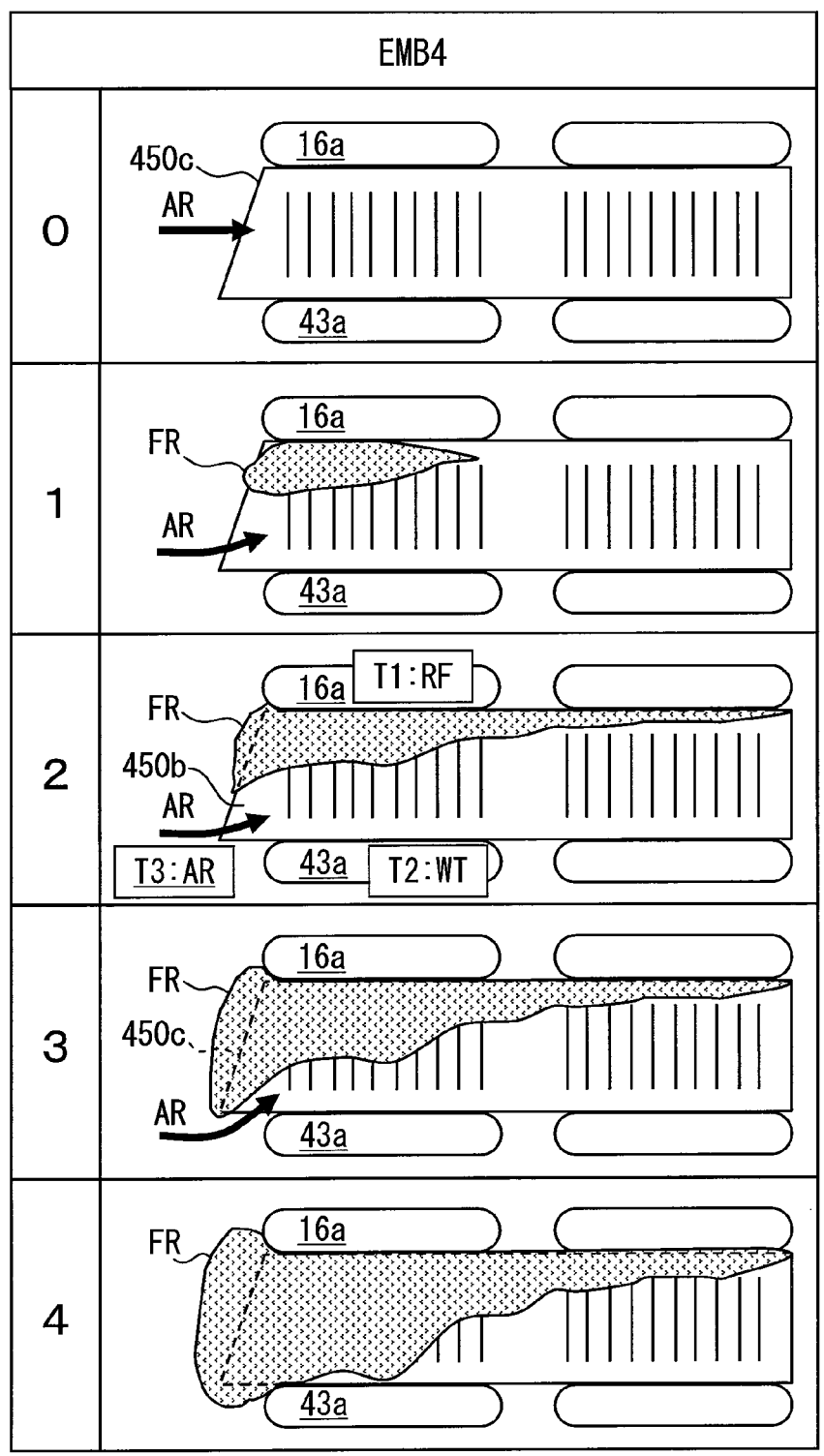
FIG. 22 is a schematic diagram showing the growth of frost on the heat exchanger in the fourth embodiment.

FIG. 22 shows the process of growth of the frost FR in this embodiment EMB4. Also in this embodiment, like the previous embodiments, the air AR can be introduced from the side portion of the fin 450. As shown in the figure, after the frost FR grows on the fin 450, the air AR can flow into the air passages 16b and 43b through the side portion of the fin 450 on the upstream side of the water tube 43a.

As shown in the stage 2, T1 is a temperature of the refrigerant RF, T2 is a temperature of the coolant WT, and T3 is a temperature of the air AR. In many operating states of the heat pump cycle 2, the following relations are obtained: T2>T1, and T3>T1. Additionally, the protrusion 450b is a part which is the farthest from the refrigerant tube 16a. In contrast, the protrusion 450b is closer to the water tube 43a than the refrigerant tube 16a. Thus, the protrusion 450b is at a high temperature close to the temperature T2. Specifically, the side portion of the fin 450 on the water tube 43a side is at a temperature around the temperature T2. As a result, the growth of the frost FR in the stages 2 and 3 becomes mild. It takes a long time for the frost FR to expand and cover the upstream end 450c. Thus, the closing of the air passages 16b and 43b due to the frost FR can be suppressed to improve the resistance to frost formation. These advantages are achieved by protruding the fin 450 toward the upstream side of the flow of the air AR with respect to the water tube 43a on at least water tube 43a side.

Fifth Embodiment

Figure 23:
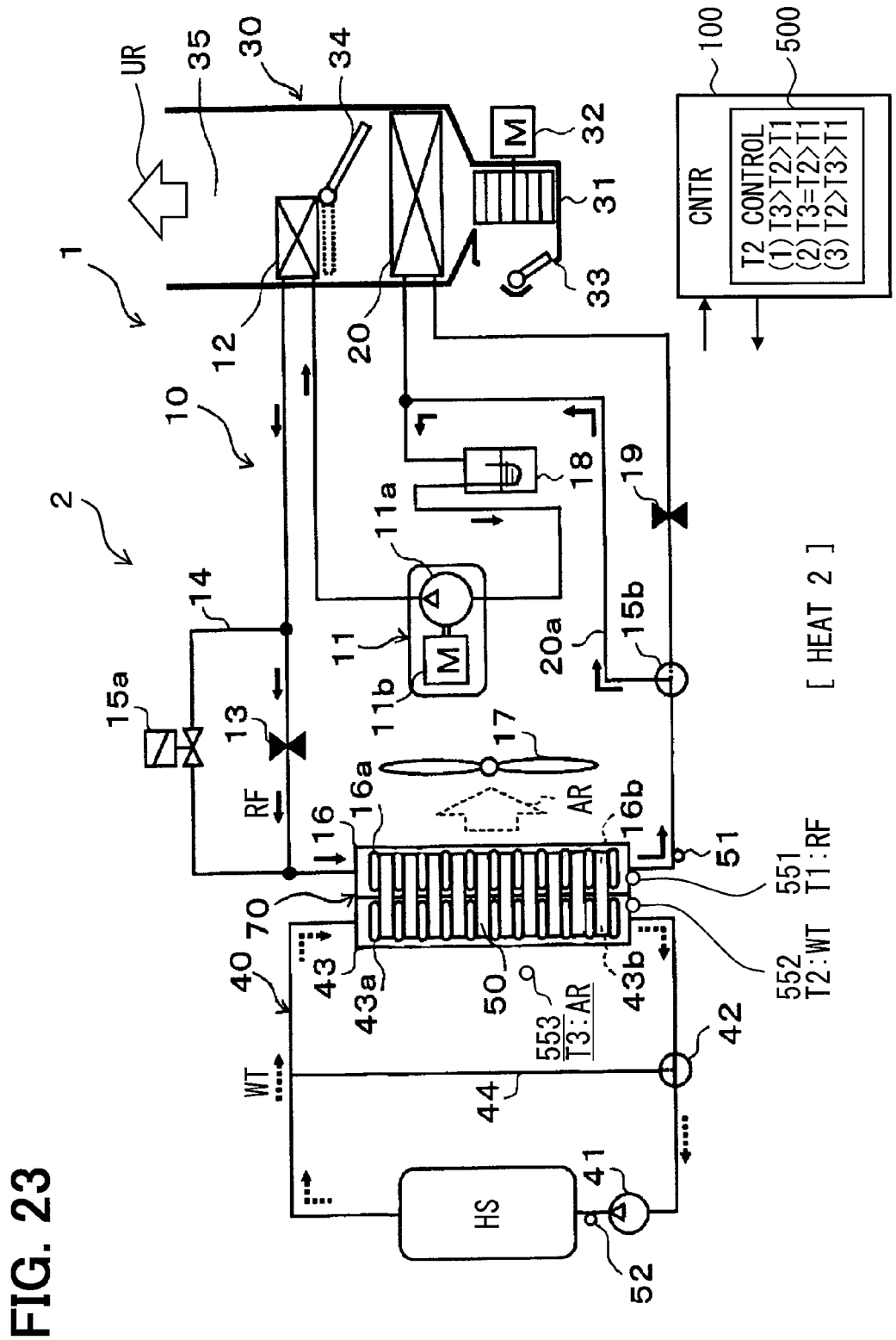
FIG. 23 is a schematic diagram showing a waste heat recovering operation of a heat pump cycle in a fifth embodiment of the present disclosure.

This embodiment is a modified example of the previous embodiment as a basic embodiment. FIG. 23 shows a flow path in a waste heat recovering operation in this embodiment.

The heat pump cycle 2 includes a temperature sensor 551 for detecting the temperature T1 of the refrigerant RF in the heat exchanger 70. The heat pump cycle 2 includes a temperature sensor 552 for detecting the temperature T2 of the coolant WT in the heat exchanger 70. The heat pump cycle 2 includes a temperature sensor 553 for detecting the temperature T3 of the air AR in the heat exchanger 70.

The controller 100 includes a temperature controller (T2-CONTROL) 500 for controlling the temperature T2 to a target temperature. The temperature controller 500 controls the device including the coolant circuit 40 such that the temperature T2 of the coolant WT is controlled to the target temperature. Specifically, the temperature controller 500 can control the pump 41, and/or three-way valve 42. The temperature controller 500 receives input of the temperatures T1, T2, and T3 from the temperature sensors 551, 552, and 553. The temperature controller 500 sets the target temperature of the temperature T2 so as to adjust the waste heat recovery amount. The target temperature is set to satisfy the following relations: a first relation of T3>T2>T1, a second relation of T3=T2>T1, or a third relation of T2>T3>T1. The controller 100 sets the target temperature so as to achieve the first relation or second relation when the waste heat is not recovered from the coolant WT or when a small amount of waste heat is recovered. The controller 100 sets the target temperature so as to achieve the third relation when a large amount of waste heat is recovered from the coolant WT.

Figure 24:
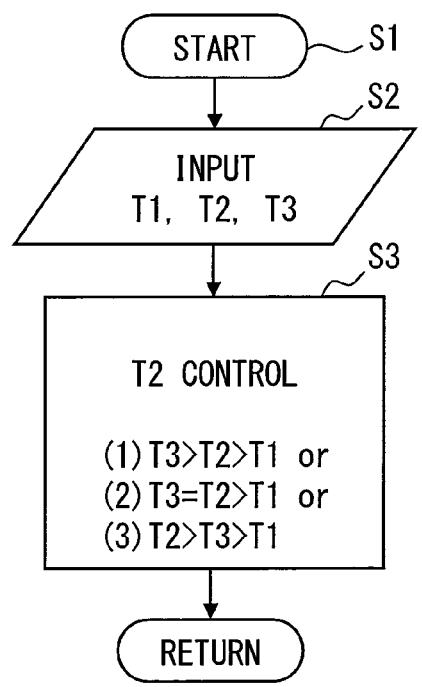
FIG. 24 is a flow chart showing control processing of a heat pump cycle in the fifth embodiment.

FIG. 24 is a flow chart showing a control process S1 executed by the controller 100. The control process S1 is performed by the temperature controller 500. In step S2, the controller 100 inputs the temperature T1 of the refrigerant RF in the heat exchanger 70, the temperature T2 of the coolant WT in the heat exchanger 70, and the temperature T3 of the air AR in the heat exchanger 70. The temperatures T1, T2, and T3 are input from the sensors 551, 552, and 553. In step S3, the controller 100 performs feedback control of the coolant circuit 40 such that the temperature T2 approaches or is identical to the target temperature.

The controller 100 performs control such that the temperature T2 of medium (coolant WT) in the heat exchanger 70 is higher than the temperature T1 of the refrigerant RF when the refrigerant RF absorbs heat in the refrigerant tubes 16a and 516a (T2>T1). The frost formation on the side wall portion of the protrusion 50b is suppressed by controlling the temperature T2 of the medium of the heat exchanger 70 such that the temperature T2 is higher than the temperature T1 of the refrigerant RF in the heat exchanger 70. As a result, the closing of the air passage due to the frost formation can be suppressed, thereby producing the heat pump cycle 2 with excellent resistance to frost formation.

The controller 100 often controls the temperature T2 of the medium such that the temperature T2 is in a range between the temperature T3 of the air AR and the temperature T1 of the refrigerant RF (T3>T2>T1). In this case, the heat of the air AR is supplied to the refrigerant RF. The heat of the medium (coolant WT) is supplied to the refrigerant RF. Further, a part of the heat of the air AR is supplied to the refrigerant RF via the medium.

The controller 100 often controls the temperature T2 of the medium such that the temperature T2 is higher than the temperature T3 of the air AR and the temperature T1 of the refrigerant RF (T2>T3>T1). In this case, the heat of the air AR is supplied to the refrigerant RF. The heat of the medium is supplied to the refrigerant RF. Further, a part of heat of the medium is supplied to the refrigerant RF via the air AR.

Figure 25:
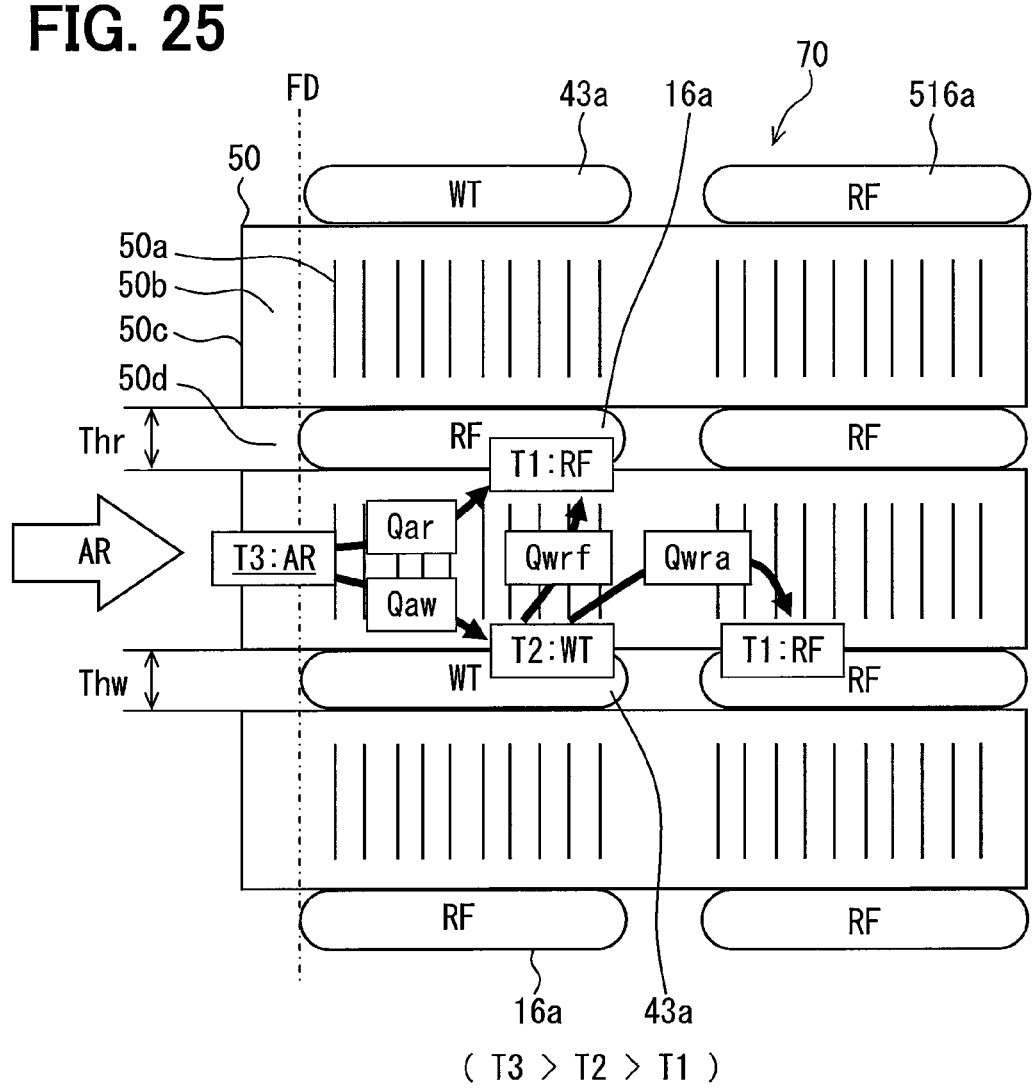
FIG. 25 is a schematic diagram showing heat flows on the heat exchanger in the fifth embodiment.

As shown in FIG. 25, the tubes 16a, 43a, and 516a are arranged to form an upstream line positioned on the upstream side of the flow of the air AR and a downstream line positioned on the downstream side with respect to the upstream line. The water tube 43a in the upstream line and the refrigerant tube 516a in the downstream line are superimposed over each other in the flow direction of the air AR. In short, the refrigerant tube 516a is disposed on the downstream side of the water tube 43a in the flow direction of the air AR. With this structure, even when a part of heat of the coolant WT is supplied to the air AR in the upstream line, the heat is supplied from the air AR to the refrigerant tube 516a in the downstream line. Thus, the heat of the coolant WT is effectively supplied to the refrigerant RF.

When the temperature relation is T3>T2>T1, a heat flow Qar, a heat flow Qaw, and a heat flow Qwrf are generated. Because of T3>T1, the heat contained in the air AR is dissipated into the refrigerant RF by the heat flow Qar. Simultaneously, because of T3>T2, the heat contained in the air AR is also dissipated into the coolant WT by the heat flow Qaw. Further, because of T2>T1, the heat contained in the coolant WT is dissipated into the refrigerant RF by the heat flow Qwrf via the fins 50. Thus, the heat contained in the air AR as the heat source and the heat contained in the air WT are recovered by the refrigerant.

As the temperature of the air AR is decreased while the air AR flows over the heat exchanger 70, a part satisfying T2>T3 often occurs over the heat exchanger 70. In this case, the heat contained in the coolant WT is dissipated into the refrigerant RF by the heat flow Qwra passing through the air AR. The heat contained in the coolant WT is dissipated into the air AR. The air AR obtaining heat from the coolant WT flows in the vicinity of the refrigerant tubes 516a in the downstream line. Thus, the heat contained in the air AR is dissipated into the refrigerant RT flowing through the refrigerant tube 516a. Once the heat contained in the coolant WT is dissipated into the air AR, most of the dissipated heat is absorbed and recovered in the refrigerant RF. Therefore, the heat of the air AR serving as a heat source is effectively recovered.

Figure 26:
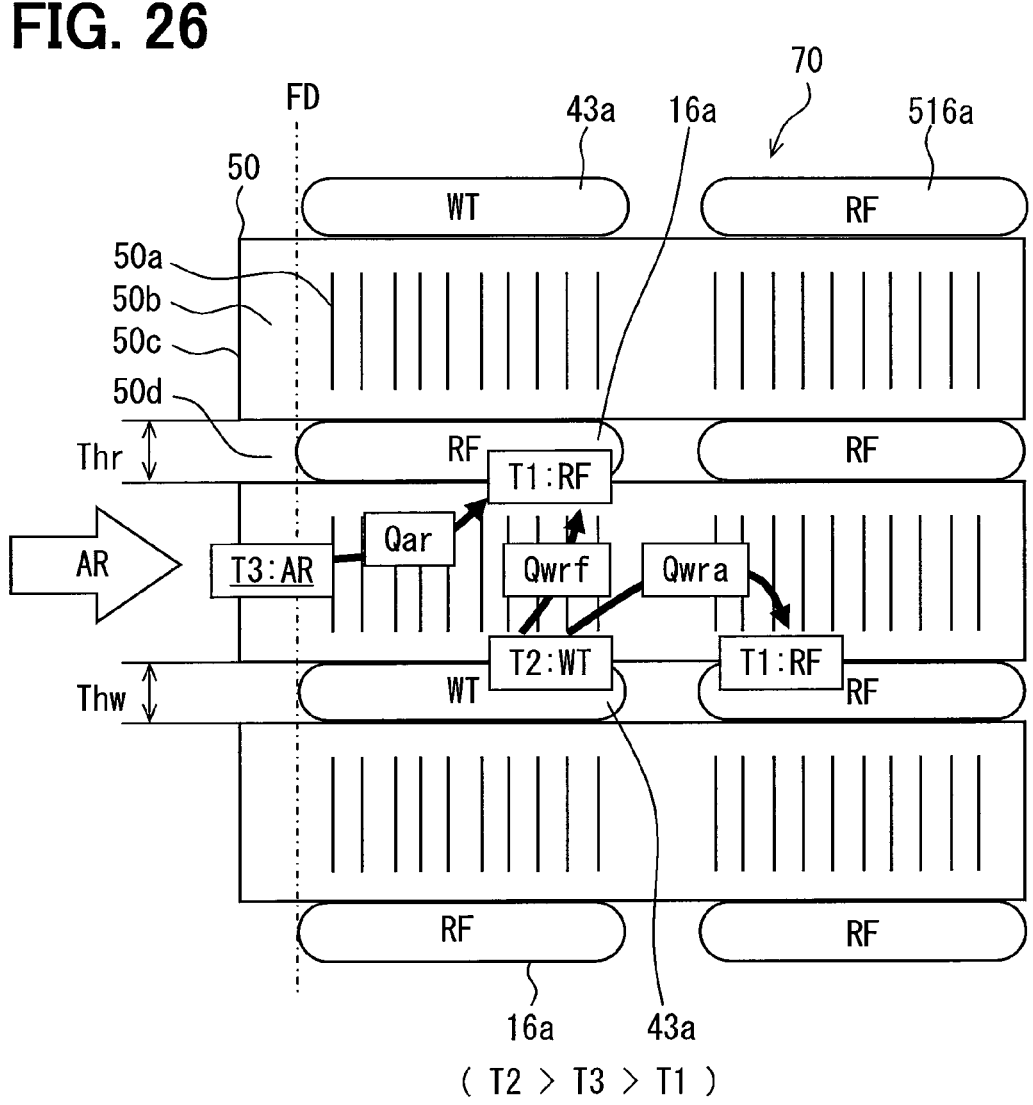
FIG. 26 is another schematic diagram showing other heat flows on the heat exchanger in the fifth embodiment.

As shown in FIG. 26, when the temperature relation is T2>T3>T1, a heat flow Qaw from the air AR to the coolant WT is not generated. In this case, because of T2>T3, the heat flow Qwra reaching the refrigerant RF from the coolant WT via the air AR contributes to effective recovery of the heat of the coolant WT as the heat source. The heat pump cycle 2 is appropriate for the heat exchanger 70 in which the medium tubes 43a in the upstream line and the refrigerant tubes 516a in the downstream line are superimposed over each other in the flow direction of air. With this structure, even when a part of heat of the medium is supplied to the air AR in the upstream line, the heat is supplied from the air AR in the downstream line to the refrigerant tube 516a. Thus, the heat of the medium is effectively supplied to the refrigerant RF.

Sixth Embodiment

Figure 27:
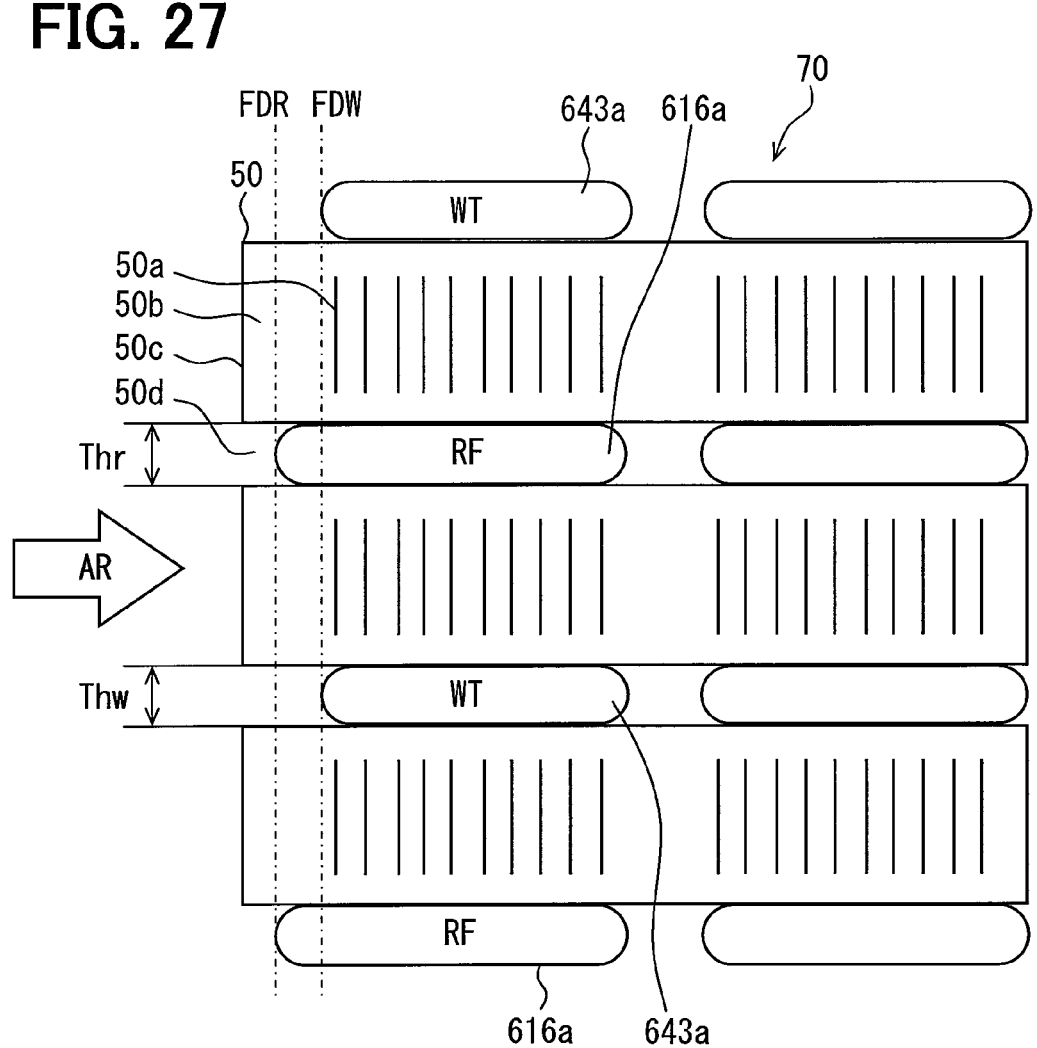
FIG. 27 is a schematic cross-sectional view of a heat exchanger in a sixth embodiment of the present disclosure.

This embodiment is a modified example of the previous embodiment as a basic embodiment. As shown in FIG. 27, also in this embodiment, the fin 50 is protruded toward the upstream side of the flow of the air AR on at least the water tube 643a side with respect to the water tube 643a. Also, in this embodiment, the fin 50 is protruded on the refrigerant tube 616a side toward the upstream side of the flow of the air AR with respect to the refrigerant tube 616a.

The width of the refrigerant tube 616a in the flow direction of the air AR is larger than that of the water tube 643a. In other words, the width of the water tube 643a in the flow direction of the air AR is smaller than that of the refrigerant tube 616a. The upstream end of the refrigerant tube 616a in the flow direction of the air AR is protruded toward the upstream side of the flow of the air AR with respect to the upstream end of the water tube 643a. In other words, the upstream end of the water tube 643a in the flow direction of the air AR is retreated toward the downstream side of the flow of the air AR with respect to the upstream end of the refrigerant tube 616a. The refrigerant tubes 616a forming the upstream line define an upstream end FDR. The water tubes 643a forming the upstream line define an upstream end FDW.

The fin 50 includes a protrusion 50b protruding toward the upstream side of the flow of the air AR with respect to at least upstream end FDW. The protrusion 50b is protruded toward the upstream side of the flow of the air AR with respect to the upstream end FDR. As a result, the clearances 50d for drainage are partitioned on the upstream side of the refrigerant tube 616a.

In this embodiment, the refrigerant tube 616a and the water tube 643a with different widths are arranged as shown in the figure. Instead of this, the refrigerant tube and the water tube which have the same or different width may be shifted in the flow direction of the air. Also with this structure, the fins 50 can be positioned on the upstream side of the air flow of the water tube so as to protrude toward the upstream side of the air flow.

In this embodiment, the upstream end 50c of the fin 50 is positioned on the upstream side with respect to the upstream end FDR of the refrigerant tube 616a. Instead of this, the upstream end 50c may be aligned with the upstream end FDR. In this case, the fins 50 only on the water tube 643a side are protruded toward the upstream side of the flow of the air AR with respect to the water tube 643a. Also, in this case, the clearance 50d is not formed. Even with this structure, the fins 50 can be positioned on the upstream side of the air flow of the water tube such that the fins 50 are protruded toward the upstream side of the air flow.

With this structure, after the frost grows on the fins 50, the air AR can flow into the air passage 16b and 43b through the side portions of the fins 50 on the upstream side of the water tube 643a.

Other Embodiments

The preferred embodiments of the present disclosure have been described above, but the present disclosure is not limited to the above-mentioned embodiments. Various modifications and changes can be made without departing from the scope and spirit of the present disclosure. The structures of the above embodiments are only illustrative, and the scope of the present disclosure is not limited to these description. The scope of the present disclosure can include all modifications within equivalent meanings and ranges as in the appended claims.

For example, means and functions provided by the controller can be provided by only a software, only a hardware, or a combination thereof. For example, the controller may be comprised of an analog circuit.

The fin 50 may be protruded toward the downstream side of the flow of the air AR. Instead of the fin 50, a fin without the louver 50a may be adopted. The protrusion 50b may be provided with the louver 50a.

In the above-mentioned embodiments, the coolant circuit 40 is used only as a heat source for applying heat to the refrigerant circuit 10. Instead of this, the coolant circuit 40 may be used as an auxiliary radiator for taking off heat from the refrigerant circuit 10. For example, in the cooling operation, the heat may be discharged from the refrigerant circuit 10 into the coolant circuit 40. The coolant circuit 40 may include a heat exchanger for dissipating heat from the coolant by exchange of heat between the coolant and air AR, in addition to the radiator 43.

In the above-mentioned embodiments, the heat source device for defrosting is provided by the coolant circuit 40. Instead of this, a fluid circuit can be used which flows the heat medium that can store therein the amount of heat for defrosting. For example, instead of the coolant circuit 40, a circuit for allowing the refrigerant to flow therethrough may be used.

Figure 28:
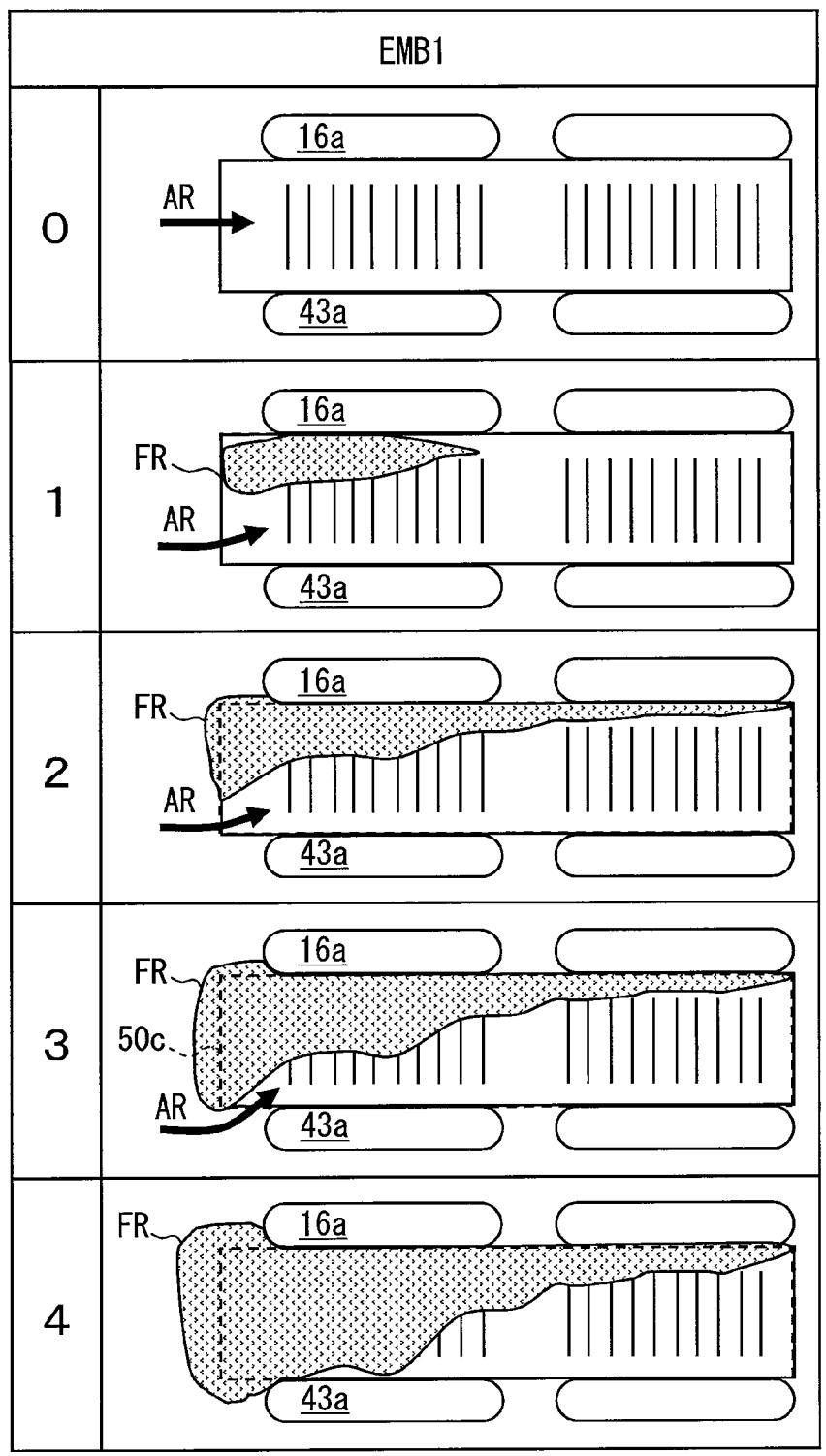
FIG. 28 is a schematic diagram showing another example of the growth of frost on the heat exchanger in the first embodiment.

The frost on the heat exchanger 70 of the above embodiments often grows as shown in FIG. 28. In the example, as shown in the first stage of the figure, the frost starts growing from an upstream end of the fin 50 in the flow direction. The frost also starts growing from the center of the fin 50 in the width direction. Such growth of the frost is due to the high humidity of air in the upstream part of the fin 50, and to the high heat exchange performance provided by the louver 50a. Even when the frost grows in this manner, the structure as shown in the figure forms a passage of air AR at the side portion of the fin for a long time.

What is claimed is:

1. A heat exchanger comprising:
a tube portion including a plurality of refrigerant tubes in which a refrigerant for exchanging heat with air flows, and a plurality of medium tubes in which a medium for exchanging heat with the refrigerant flows;
a plurality of air passages provided between adjacent tubes of the tube portion; and
a plurality of fins provided in the air passages and bonded to the adjacent tubes of the tube portion, wherein
a first group of the refrigerant tubes and a first group of the medium tubes are disposed on an inflow side for the air of the tube portion, and
each of the fins includes a protrusion extending at least in the vicinity of the adjacent medium tube, and protruding toward an upstream side of flow of the air with respect to the medium tube,
the medium flowing through the medium tubes is a defrosting medium for supplying heat for a defrosting,
one of the first group of the refrigerant tubes is positioned between two of the first group of the medium tubes on an inflow side for the air of the tube portion, the refrigerant tubes and the medium tubes being arranged in parallel,
the protrusion protrudes toward an upstream side of the flow of the air with respect to the refrigerant tubes,
the two protrusions, with respect to one of the refrigerant tubes disposed therebetween, form a clearance therebetween that allows melt water generated in the defrosting to flow through the clearance on an upstream side of the refrigerant tube,
the refrigerant tubes and the medium tubes are arranged to extend in a direction of gravitational force,
the clearance extends along the refrigerant tubes,
each of the fins is made of a corrugated fin,
each of the fins has a plurality of peak portions bonded to an adjacent refrigerant tube, and
a width of the refrigerant tube in a stacking direction of the tubes is smaller than a half of a pitch of the plurality of peak portions of the fins.

2. The heat exchanger according to claim 1, wherein
the protrusion has an end facing an upstream side of the flow of the air, and
the protrusion protrudes to be capable of introducing the air into the air passage from a side portion of the protrusion even when a space in the vicinity of the end is closed by a core of frost.

3. The heat exchanger according to claim 1, wherein
the tube portion includes one upstream line in which the tubes are arranged in one line, and one downstream line in which the tubes are arranged in one line and which is positioned on a downstream side of the flow of the air with respect to the upstream line,
the upstream line includes a second group of the medium tubes,
the downstream line includes a second group of the refrigerant tubes, and
the second group of the medium tubes in the upstream line are positioned on the upstream side of the flow of the air with respect to the second group of the refrigerant tubes in the downstream line.

4. The heat exchanger according to claim 3, wherein
the refrigerant tubes and the medium tubes are arranged to extend in a direction of gravitational force, and
the clearance extends along the refrigerant tube.

5. The heat exchanger according to claim 4, wherein a width of the refrigerant tube is smaller than a width of the medium tube.

6. The heat exchanger according to claim 1, wherein
the tube portion includes one upstream line in which the tubes are arranged in one line, and one downstream line in which the tubes are arranged in one line and which is positioned on a downstream side of the flow of the air with respect to the upstream line,
the upstream line includes a second group of the medium tubes, and a second group of the refrigerant tubes, and
the second group of the refrigerant tubes and the second group of the medium tubes are alternately arranged in at least the upstream line such that one of the second group of the refrigerant tubes is positioned between two of the second group of the medium tubes.

7. The heat exchanger according to claim 1, wherein a pair of the peak portions of two of the fins, with respect to one of the refrigerant tubes disposed between pair of the peak portions are arranged such that one of the pair of the peak portions and the other one of the pair of the peak portions are alternately arranged in the direction of gravitational force.

8. A heat pump cycle comprising:
the heat exchanger according to claim 1,
a refrigerant circuit for flowing a refrigerant to the refrigerant tube, thereby supplying heat absorbed in the refrigerant to a user-side heat exchanger;
a medium circuit for flowing the medium to the medium tube; and
a controller for controlling a temperature of the medium in the heat exchanger to a temperature higher than a temperature of the refrigerant obtained when the refrigerant absorbs heat in the refrigerant tube.

9. The heat pump cycle according to claim 8, wherein the controller controls the temperature of the medium to between a temperature of the air and the temperature of the refrigerant.

10. The heat pump cycle according to claim 9, wherein the controller controls the temperature of the medium to a temperature higher than the temperature of the air and the temperature of the refrigerant.

11. A heat pump cycle comprising:
the heat exchanger according to claim 1;
a refrigerant circuit for flowing a refrigerant to the refrigerant tube, thereby supplying heat absorbed in the refrigerant to a user-side heat exchanger; and
a medium circuit for flowing the medium to the medium tube, wherein
the medium flowing through the medium tube is a heat storage medium for storing therein heat from an external heat source, and
the medium circuit maintains the temperature of the external heat source at a temperature higher than the temperature at which the refrigerant in the refrigerant tube absorbs heat.

12. The heat pump cycle according to claim 11, wherein the medium circuit supplies heat to be absorbed in the refrigerant flowing through the refrigerant tube.

13. The heat pump cycle according to claim 11, wherein the refrigerant circuit supplies heat for defrosting by use of refrigerant flowing through the refrigerant tube in the defrosting.

14. The heat exchanger according to claim 1, wherein the plurality of peak portions of the fins face a plurality of valley portions of adjacent fins through the clearance.

15. The heat exchanger according to claim 1, wherein two of the fins positioned on different sides of one of the refrigerant tubes are arranged such that the plurality of peak portions of one of the two fins bonded to the refrigerant tube are shifted in the direction of gravitational force from the plurality of peak portions of another of the two fins bonded to the refrigerant tube without being overlapped with each other in the stacking direction.

16. The heat exchanger according to claim 1, wherein the protrusion of each fin has an upstream end inclined with respect to a flow direction of the air, and a first edge of the upstream end adjacent to the medium tube is located in the flow direction on an upstream side of a second edge of the upstream end adjacent to the refrigerant tube.

17. The heat exchanger according to claim 16, wherein the second edge of the upstream end is located at the same position in the flow direction of the air as an upstream end of the refrigerant tube.

18. The heat exchanger according to claim 1, wherein an upstream end of each refrigerant tube of the first group is located on an upstream side of an upstream end of each medium tube of the first group in a flow direction of the air.

19. The heat exchanger according to claim 1, wherein the clearance is partitioned on the upstream side of the refrigerant tubes.

20. The heat exchanger according to claim 1, wherein the refrigerant tubes and the medium tubes have different widths and are arranged offset from each other in the flow direction of the air.

* * * * *